(12) United States Patent
Nishino et al.

(10) Patent No.: US 9,729,233 B2
(45) Date of Patent: Aug. 8, 2017

(54) COMMUNICATION DEVICE

(71) Applicant: Mitsubishi Electric Corporation, Tokyo (JP)

(72) Inventors: Yuichi Nishino, Tokyo (JP); Hidenobu Tsuji, Tokyo (JP); Hideaki Ochimizu, Tokyo (JP); Nobuki Kotake, Tokyo (JP); Masaharu Imaki, Tokyo (JP); Shumpei Kameyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 52 days.

(21) Appl. No.: 14/785,697

(22) PCT Filed: May 9, 2014

(86) PCT No.: PCT/JP2014/062501
§ 371 (c)(1),
(2) Date: Oct. 20, 2015

(87) PCT Pub. No.: WO2014/181871
PCT Pub. Date: Nov. 13, 2014

(65) Prior Publication Data
US 2016/0094290 A1    Mar. 31, 2016

(30) Foreign Application Priority Data
May 10, 2013 (JP) ................. 2013-100405

(51) Int. Cl.
*G06F 19/00* (2011.01)
*H04B 10/079* (2013.01)
(Continued)

(52) U.S. Cl.
CPC ....... *H04B 10/07953* (2013.01); *G01C 21/10* (2013.01); *H04B 10/112* (2013.01); *H04B 10/564* (2013.01)

(58) Field of Classification Search
USPC .......................................................... 701/517
See application file for complete search history.

(56) References Cited

U.S. PATENT DOCUMENTS 4,777,660 A * 10/1988 Gould ................ H04B 10/2587
359/245
5,070,483 A * 12/1991 Berni ........................ G01H 9/00
356/28.5

(Continued)

FOREIGN PATENT DOCUMENTS

JP          01212384 A      8/1989
JP          07-099480 A     4/1995

(Continued)

OTHER PUBLICATIONS

F.D. Kashani et al., Reliability analysis of the auto-tracked FSO communication links, Telecommunications (1st), 2010 5th International Symposium on Telecommunications, Dec. 4, 2010, pp. 452-457.

(Continued)

*Primary Examiner* — Ronnie Mancho
(74) *Attorney, Agent, or Firm* — Studebaker & Brackett PC

(57) ABSTRACT

An S/N calculation circuit 12 to calculate the S/N ratio of a received signal, and an S/N comparison circuit 13 to compare the S/N calculated by the S/N calculation circuit 12 with a threshold Th are disposed, and a parameter setting circuit 14 controls the radiation state of a beam radiated from a transmission optical system 5 according to the result of the comparison performed by the S/N comparison circuit 13. As a result, even if the state of the propagation environment gets worse, degradation in the communication quality can be prevented and communicative stabilization can be achieved.

15 Claims, 24 Drawing Sheets

(51) Int. Cl.
  *H04B 10/564* (2013.01)
  *G01C 21/10* (2006.01)
  *H04B 10/112* (2013.01)

(56) References Cited

U.S. PATENT DOCUMENTS

| | | | | |
|---|---|---|---|---|
| 5,109,362 A * | 4/1992 | Berni | | G01H 9/00 |
| | | | | 356/487 |
| 7,397,601 B2 * | 7/2008 | Laudo | | B01L 9/06 |
| | | | | 359/368 |
| 9,366,872 B2 * | 6/2016 | Honea | | G02B 27/0927 |
| 2006/0251421 A1 | 11/2006 | Arnon | | |
| 2009/0097856 A1 | 4/2009 | Sasai et al. | | |
| 2012/0008048 A1 * | 1/2012 | Sekine | | G06T 19/006 |
| | | | | 348/566 |
| 2012/0050750 A1 * | 3/2012 | Hays | | G01J 9/04 |
| | | | | 356/519 |
| 2015/0345906 A1 * | 12/2015 | Varshneya | | F41G 3/165 |
| | | | | 235/404 |

FOREIGN PATENT DOCUMENTS

| | | |
|---|---|---|
| JP | 08-149077 A | 6/1996 |
| JP | 09-292464 A | 11/1997 |
| JP | 2005-354335 A | 12/2005 |
| JP | 2006-203601 A | 8/2006 |
| JP | 2006-319882 A | 11/2006 |
| JP | 2007-49290 A | 2/2007 |
| JP | 2011-191250 A | 9/2011 |
| JP | 2012-156685 A | 8/2012 |

OTHER PUBLICATIONS

The extended European search report issued by the European Patent Office on Nov. 22, 2016, which corresponds to European Patent Application No. 14795385.5-1874 and is related U.S. Appl. No. 14/785,697.

International Search Report, PCT/JP2014/062501, Jul. 1, 2014.

* cited by examiner

FIG.4

| Setting Number | Average Power | Repetition Frequency | Pulse Width | Divergence | Beam Diameter | ... | Noise Voltage |
|---|---|---|---|---|---|---|---|
| 1 | $P1$ | $f1$ | $w1$ | $\theta 1$ | $d1$ | $X1$ | $V_N 1$ |
| 2 | $P2$ | $f2$ | $w2$ | $\theta 2$ | $d2$ | $X2$ | $V_N 2$ |
| 3 | $P3$ | $f3$ | $w3$ | $\theta 3$ | $d3$ | $X3$ | $V_N 3$ |
| ... | ... | ... | ... | ... | ... | ... | |
| $n$ | $Pn$ | $fn$ | $wn$ | $\theta n$ | $dn$ | $Xn$ | $V_N n$ |

FIG.8

| Comparison Result | State | Setting Detail of Parameter |
|---|---|---|
| ① | Input Signal Is Insufficient | Increase in Output Power |
| ② | Foreign Object Crossing Propagation Path Exists | Enlargement of Beam Diameter or Enlargement of Divergence |
| ③ | Power Consumption Is Excess | Reduction in Output Power |
| ④ | S/N Ratio Is Adequate | No Change |

COMMUNICATION DEVICE

FIELD OF THE INVENTION

The present invention relates to a communication device having a large amount of information transmitted in wireless communications and having high communication quality.

BACKGROUND OF THE INVENTION

In a communication device, for example, it is important to ensure a desired bit error rate (BER) independently upon the state of a propagation environment, such as that in the sea or in the air, thereby providing an improvement in the transmission capacity and achieving low power consumption. The following patent reference 1 discloses a communication device that performs laser communications between two spatially distant points by using multiple beams and according to a user's operation information inputted from an external inputter.

In this communication device, requirements for variations, such as the direction of angular displacement of the beam axis of each of the multiple beams used for the laser communications, and a pointing error for the communications partner, are set, and the divergence and the number of beams of the laser are determined according to the requirements for variations.

Further, a telescope for laser beam transmission is controlled according to the requirements for variations, so that a plurality of lasers are transmitted to the communications partner.

As a result, because laser communications can be implemented by using the multiple beams for which variations in the intensity of light received by the communications partner are optimized, the variations in the intensity of light received by the communications partner can be reduced, and communicative stabilization can be achieved.

RELATED ART DOCUMENT

Patent Reference

Patent reference 1: Japanese Unexamined Patent Application Publication No. 2005-354335 (paragraph number [0006] and FIG. 1)

SUMMARY OF THE INVENTION

Problems to be Solved by the Invention

Because the conventional communication device is configured as above, the variations in the intensity of light received by the communications partner, which are caused by variations in the beam pointing angle, can be reduced. A problem is, however, that when the state of the propagation environment gets worse (for example, when laser is radiated into the atmospheric air in which fog, hail, snow, or the like exists, or when laser is radiated into the sea where suspended particles having a large particle diameter, such as marine snow, exist), the radiated laser is partially blocked and the received light power decreases while the received light power per unit area cannot be increased, and therefore the signal to noise ratio (referred to as the "S/N ratio" from here on) of the received signal degrades and the communication quality degrades.

The present invention is made in order to solve the above-mentioned problem, and it is therefore an object of the present invention to provide a communication device that can prevent degradation of communication quality and can achieve communicative stabilization even if the state of the propagation environment gets worse.

Means for Solving the Problem

In accordance with the present invention, there is provided a communication device including: a beam transmitter to radiate a beam toward a communication device which is a communications partner; a beam receiver to receive a beam coming from the communication device which is a communications partner; a signal demodulator to demodulate a received signal from the beam receiver to extract communication data piggybacked onto the beam; a signal to noise ratio calculator to calculate the signal to noise ratio of the received signal from the beam receiver; and a beam radiation state controller to control the radiation state of the beam radiated from the beam transmitter according to the signal to noise ratio calculated by the signal to noise ratio calculator, and, when there occurs a state in which the signal to noise ratio calculated by the signal to noise ratio calculator temporarily becomes lower than a preset threshold and then becomes higher than the threshold, enlarge the beam diameter or the angle of divergence of the beam radiated from the beam transmitter.

Advantages of the Invention

In accordance with the present invention, because the signal to noise ratio calculator to calculate the signal to noise ratio of the received signal from the beam receiver is disposed, and the beam radiation state controller is configured in such a way as to control the radiation state of the beam radiated from the beam transmitter according to the signal to noise ratio calculated by the signal to noise ratio calculator, and, when there occurs a state in which the signal to noise ratio calculated by the signal to noise ratio calculator temporarily becomes lower than the preset threshold and then becomes higher than the threshold, enlarge the beam diameter or the angle of divergence of the beam radiated from the beam transmitter, there is provided an advantage of being able to prevent degradation in the communication quality and achieve communicative stabilization even if the state of the propagation environment gets worse.

BRIEF DESCRIPTION OF THE FIGURES

FIG. 4 is an explanatory drawing showing an example of setting parameters for transmission beam;

FIG. 8 is an explanatory drawing showing a relation between a state corresponding to a comparison result acquired by an S/N comparison circuit 13, and the setting details of the parameters;

EMBODIMENTS OF THE INVENTION

Hereafter, the preferred embodiments of the present invention will be explained in detail with reference to the drawings.

Embodiment 1

In this Embodiment 1, a bidirectional communication system in which a communication device A and a communication device B perform bidirectional communications with each other will be explained.

Figure 1:
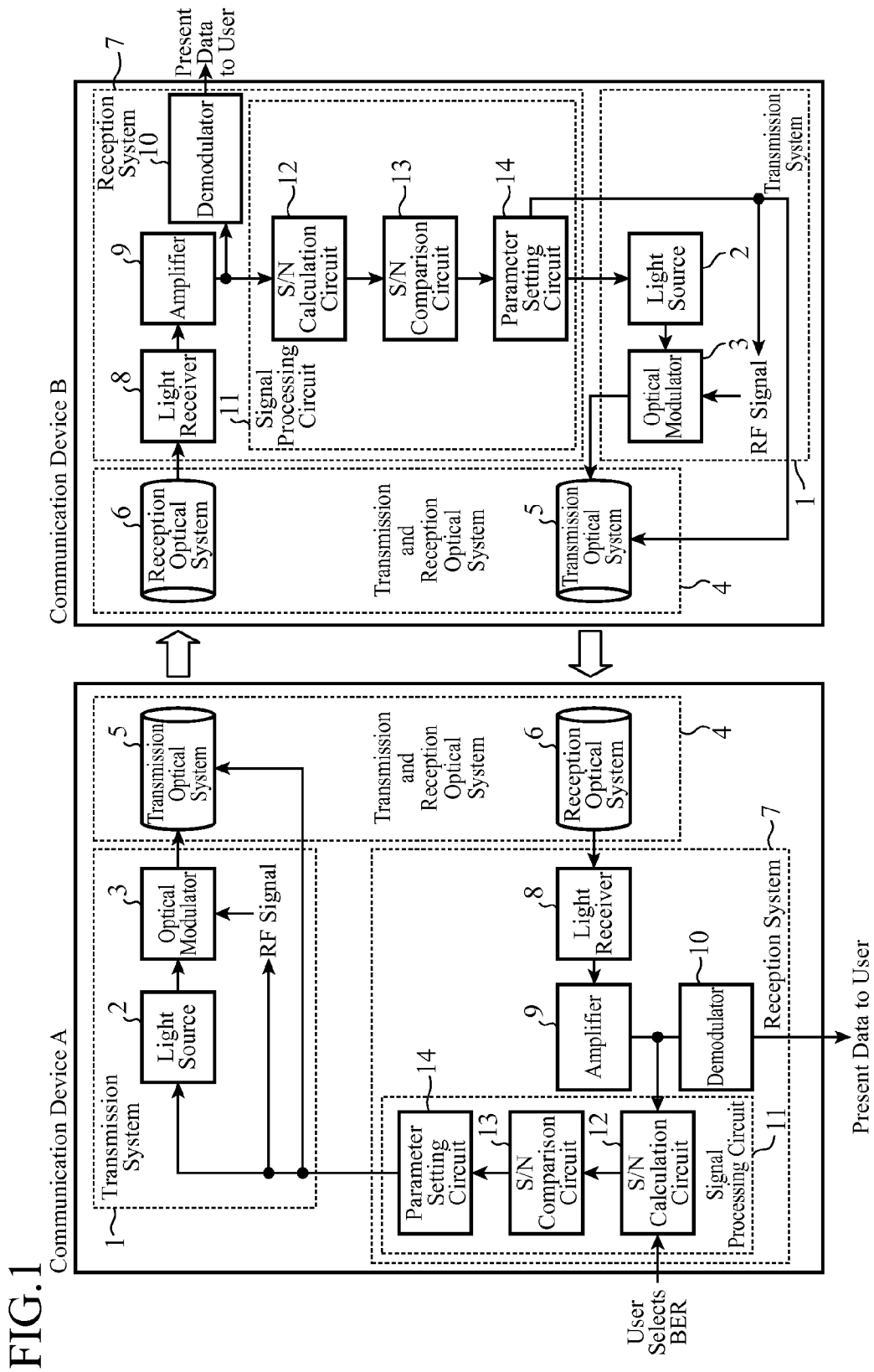
FIG. 1 is a configuration diagram showing a bidirectional communication system in accordance with Embodiment 1 of the present invention.

FIG. 1 is a configuration diagram showing the bidirectional communication system in accordance with Embodiment 1 of the present invention.

Referring to FIG. 1, the communication device A and the communication device B have the same configuration, and transmit and receive laser light (beam) onto which communication data are piggybacked to and from each other.

A transmission system 1 is configured with a light source 2 and an optical modulator 3, the light source 2 outputs a pulse laser to the optical modulator 3 as laser light, and the optical modulator 3 performs a process of modulating the intensity of the laser light outputted from the light source 2 according to an RF signal provided therefor from outside the optical modulator.

In this Embodiment 1, it is assumed that the wavelength of the laser light outputted from the light source 2 of the communication device A differs from that of laser light outputted from the light source 2 of the communication device B.

A transmission and reception optical system 4 is configured with a transmission optical system 5 and a reception optical system 6.

The transmission optical system 5 is configured with a transmission lens and so on, has a function of adjusting the beam diameter and the divergence of the laser light radiated thereby under control by a signal processing circuit 11, and radiates the laser light modulated by the optical modulator 3 toward a communication device which is a communications partner. A beam transmitter is configured with the transmission system 1 and the transmission optical system 5.

The reception optical system 6 is configured with a reception lens and so on, and has a function of receiving laser light radiated from the communication device which is a communications partner, and focusing the laser light onto a light receiver 8.

The reception optical system 6 can have, for example, a light filter, thereby achieving separation between the laser light radiated from the transmission optical system 5 and the laser light radiated from the communication device which is a communications partner, and then focusing only the laser light radiated from the communication device which is a communications partner onto the light receiver 8.

A reception system 7 is configured with the light receiver 8, an amplifier 9, a demodulator 10, and the signal processing circuit 11.

The light receiver 8 is a photo detector, such as a PD (Photo Diode) or an APD (Avalanche Photo Diode), and performs a process of converting the laser light focused by the reception optical system 6 into an electric signal (received signal). A beam receiver is configured with the reception optical system 6 and the light receiver 8.

The amplifier 9 performs a process of amplifying the signal level of the received signal which is the electric signal outputted from the light receiver 8 to a desired level.

The demodulator 10 performs a process of demodulating the received signal which is amplified by the amplifier 9 to extract the communication data piggybacked onto the laser light radiated from the communication device which is a communications partner, and output the communication data. The demodulator 10 constructs a signal demodulator.

The signal processing circuit 11 is configured with an S/N calculation circuit 12, an S/N comparison circuit 13, and a parameter setting circuit 14.

The S/N calculation circuit 12 is configured with, for example, either a semiconductor integrated circuit equipped with a CPU or a one chip microcomputer, and performs a process of calculating the S/N ratio of the received signal which is amplified by the amplifier 9. The S/N calculation circuit 12 constructs a signal to noise ratio calculator.

The S/N comparison circuit 13 is configured with, for example, either a semiconductor integrated circuit equipped with a CPU or a one chip microcomputer, and performs a process of comparing the S/N ratio calculated by the S/N calculation circuit 12 with a preset threshold Th.

The parameter setting circuit 14 is configured with, for example, either a semiconductor integrated circuit equipped with a CPU or a one chip microcomputer, and performs a process of controlling the radiation state of the laser light radiated from the transmission optical system 5 by setting parameters for laser light according to the result of the comparison performed by the S/N comparison circuit 13.

A beam radiation state controller is configured with the S/N comparison circuit 13 and the parameter setting circuit 14.

Next, operations will be explained.

Figure 2:
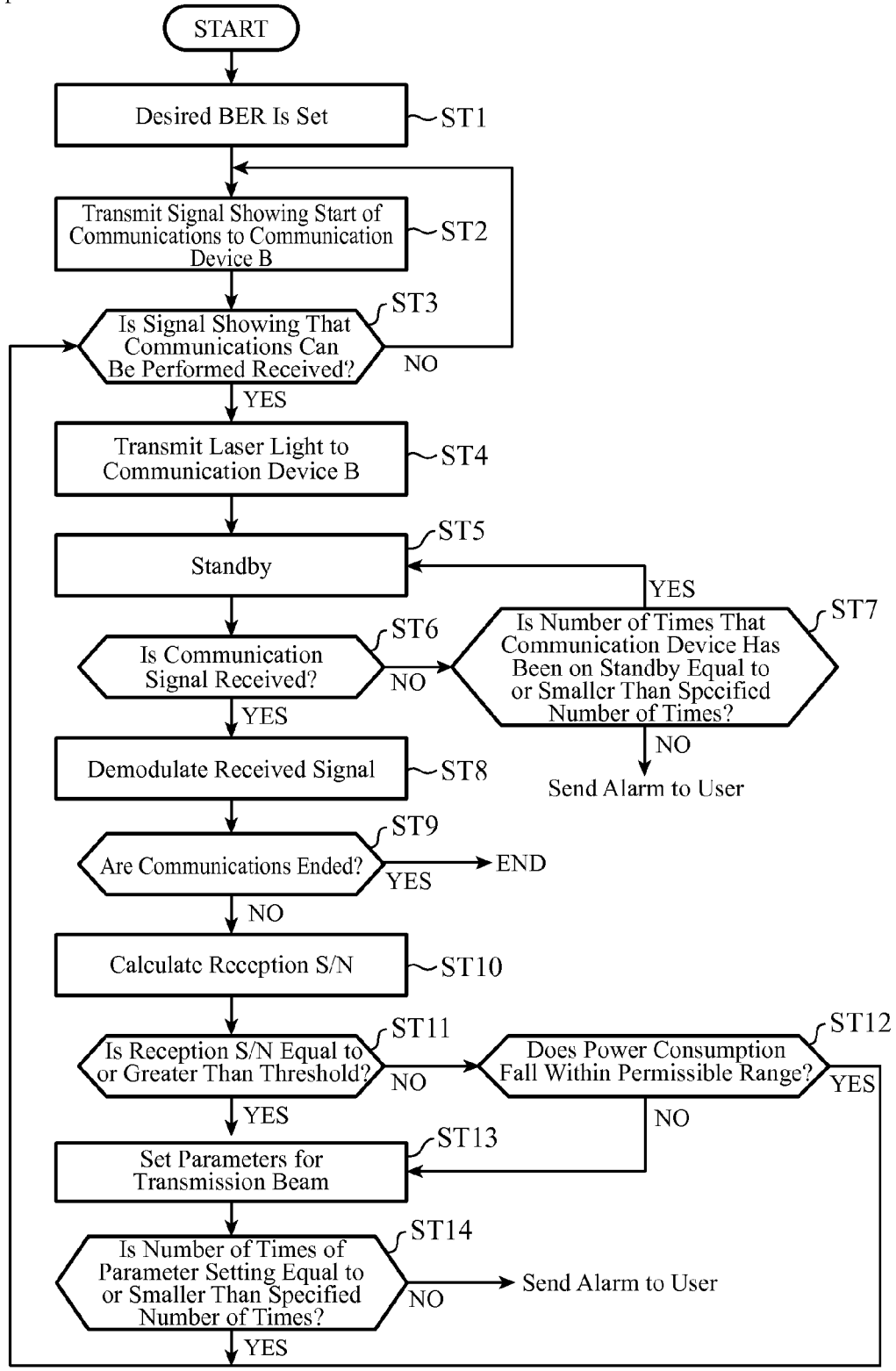
FIG. 2 is a flow chart showing the details of processing performed by a communication device A in accordance with Embodiment 1 of the present invention.

FIG. 2 is a flow chart showing the details of processing performed by the communication device A in accordance with Embodiment 1 of the present invention.

Figure 3:
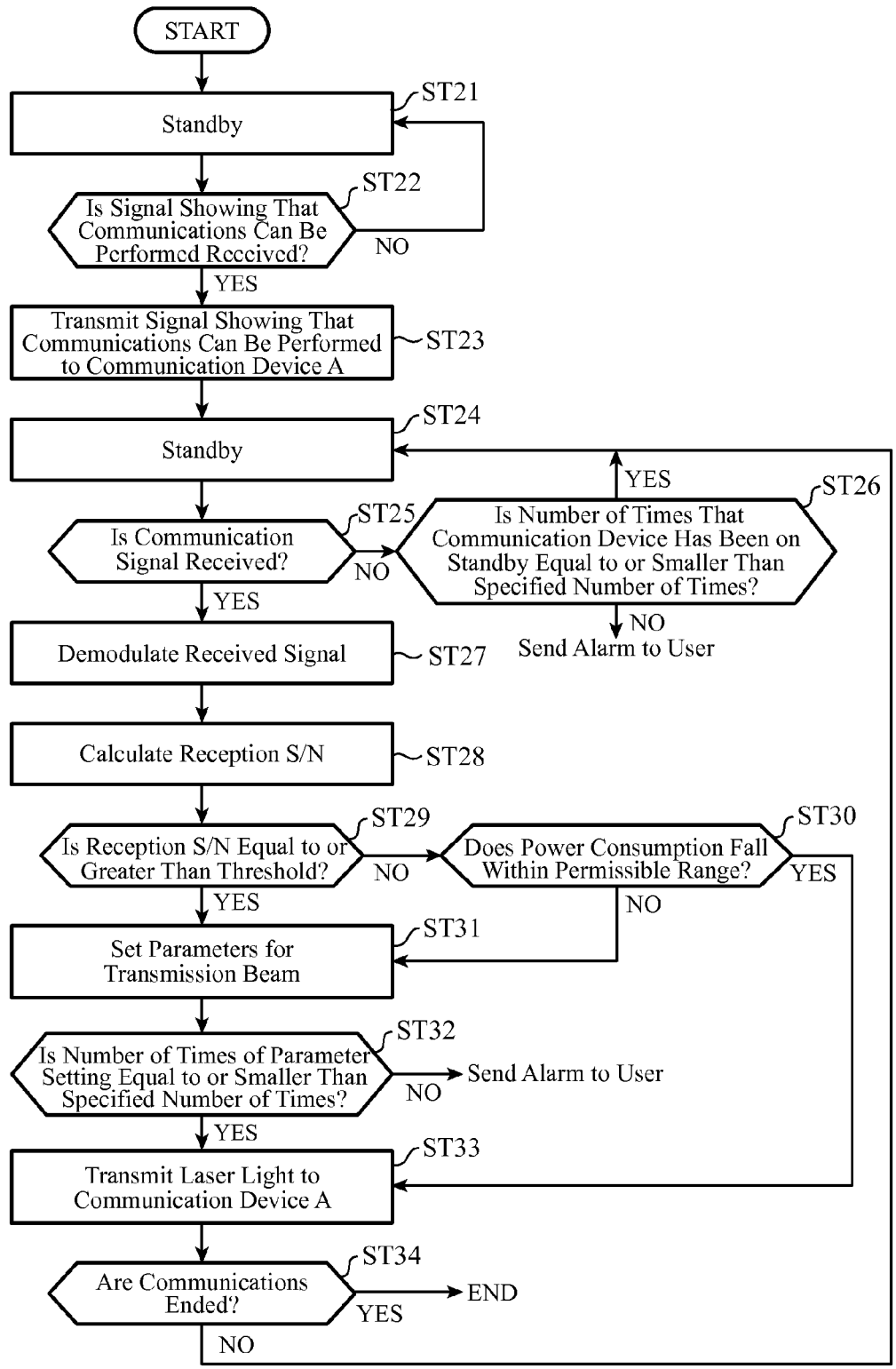
FIG. 3 is a flow chart showing the details of processing performed by a communication device B in accordance with Embodiment 1 of the present invention.

FIG. 3 is a flow chart showing the details of processing performed by the communication device B in accordance with Embodiment 1 of the present invention.

First, a user selects a desired BER.

The desired BER selected by the user is set to the S/N calculation circuit 12 of the communication device A (step ST1 of FIG. 2).

After the desired BER is set thereto, the S/N calculation circuit 12 of the communication device A determines the threshold Th for the S/N ratio on the basis of the BER.

Because a relation between the BER and the S/N ratio is expressed as shown in the following equation (1), by, for example, substituting the desired BER into the equation (1), the S/N calculation circuit determines the S/N ratio calculated from this equation as the threshold Th.

$$BER = \frac{1}{2}\mathrm{erfc}\left(\sqrt{\frac{S}{N}}\right) \quad (1)$$

In the equation (1), S/N denotes the S/N ratio and erfc denotes a complementary error function.

Because a maximum transmission capacity C can be calculated from the threshold for the S/N ratio, as shown in the following equation (2), the maximum transmission capacity C can be presented to the user.

$$C = W\log_2(1+S/N) \quad (2)$$

In the equation (2), W denotes a band width.

After the S/N calculation circuit 12 determines the threshold for the S/N ratio, the signal processing circuit 11 of the communication device A controls the transmission system 1 to cause this transmission system to radiate laser light (signal) showing a start of communications from the transmission optical system 5 (step ST2).

It is assumed that the laser light showing a start of communications is decided in advance between the communication device A and the communication device B.

It is assumed hereafter that threshold information showing the threshold Th for the S/N ratio is piggybacked onto the laser light (signal) showing a start of communications.

The signal processing circuit 11 of the communication device B has been on standby until the laser light (signal) showing a start of communications is radiated from the communication device A (step ST21 of FIG. 3), and, after the reception optical system 6 receives this signal (step ST22), the signal processing circuit controls the transmission system 1 to cause this transmission system to radiate laser light (signal) showing that communications can be performed from the transmission optical system 5 (step ST23).

It is assumed that the laser light (signal) showing that communications can be performed is decided in advance between the communication device A and the communication device B.

The signal processing circuit 11 of the communication device B also outputs a command to start transmission of the laser light to the transmission system 1.

When the threshold information is piggybacked onto the laser light (signal) showing a start of communications, the demodulator 10 demodulates the received signal from the light receiver 8 to extract the threshold information and output the threshold information to the S/N comparison circuit 13.

In contrast, when the threshold information is not piggybacked onto the laser light, the S/N calculation circuit determines the threshold Th for the S/N ratio from the desired BER selected by the user, like the S/N calculation circuit 12 of the communication device A.

After the laser light (signal) showing that communications can be performed is radiated from the communication device B and the reception optical system 6 receives this signal (step ST3 of FIG. 2), the signal processing circuit 11 of the communication device A outputs a command to start transmission of laser light to the transmission system 1.

The light source 2 in the transmission system 1 of the communication device A outputs a pulse laser to the optical modulator 3 as laser light when receiving the command to start transmission of laser light from the signal processing circuit 11.

When receiving the laser light from the light source 2, the optical modulator 3 modulates the intensity of this laser light according to the RF signal provided therefor from outside the optical modulator and outputs the laser light (communication signal) after modulation to the transmission optical system 5.

As a result, the laser light (communication signal) after modulation is radiated from the transmission optical system 5 of the communication device A toward the communication device B (step ST4).

At that time of starting the communications, the beam diameter, the angle of divergence, the average power, the pulse width, the pulse repetition frequency, etc. of the laser light radiated from the transmission optical system 5 of the communication device A are set initially by the parameter setting circuit 14.

After radiating the laser light showing that communications can be performed, the signal processing circuit 11 of the communication device B has been on standby until laser light (communication signal) is radiated from the communication device A (step ST24 of FIG. 3), and, if the reception optical system 6 does not receive the laser light (communication signal) (step ST25), the signal processing circuit determines whether the number of times that the signal processing circuit has been on standby until receiving the laser light (communication signal) reaches the number of times which is specified by the user (step ST26), and, when the number of times that the signal processing circuit has been on standby reaches the specified number of times, sends an alarm to the user.

After the laser light (communication signal) is radiated from the communication device A and the reception optical system 6 receives this laser light (communication signal) (step ST25), the light receiver 8 of the communication device B converts the laser light into an electric signal (received signal).

After the received signal which is the electric signal is outputted from the light receiver 8, the amplifier 9 of the communication device B amplifies the signal level of the received signal to the desired level.

The demodulator 10 of the communication device B demodulates the received signal which is amplified by the amplifier 9 to extract the communication data piggybacked onto the laser light radiated from the communication device A and output the communication data (step ST27).

When receiving the received signal after amplification from the amplifier 9, the S/N calculation circuit 12 of the communication device B measures the peak voltage of the received signal to calculate the S/N ratio of the received signal according to the result of the measurement (step ST28).

The S/N ratio of the received signal is calculated as shown in the following equation (3), when the signal voltage is denoted by $V_S$ and the noise voltage is denoted by $V_N$.

$$S/N = 20 \cdot \log_{10} V_S/V_N \quad (3)$$

The value of the noise voltage $V_N$ which is used when calculating the S/N ratio can be a fixed value which is set in advance by the user. As an alternative, the value of the noise voltage $V_N$ corresponding to the setting parameters for transmission beam can be stored in a reference table, as shown in FIG. 4. Further, the noise voltage $V_N$ can be measured before communications are started.

After the S/N calculation circuit 12 calculates the S/N ratio of the received signal, the S/N comparison circuit 13 of the communication device B compares the S/N ratio with the threshold Th and outputs the result of the comparison to the parameter setting circuit 14 (step ST29).

The parameter setting circuit 14 of the communication device B sets the parameters for laser light according to the comparison result acquired by the S/N comparison circuit 13, thereby controlling the radiation state of the laser light radiated from the transmission optical system 5 (steps ST29 to ST31).

Concretely, the parameter setting circuit controls the radiation state of the laser light in the following way.

Figure 5:
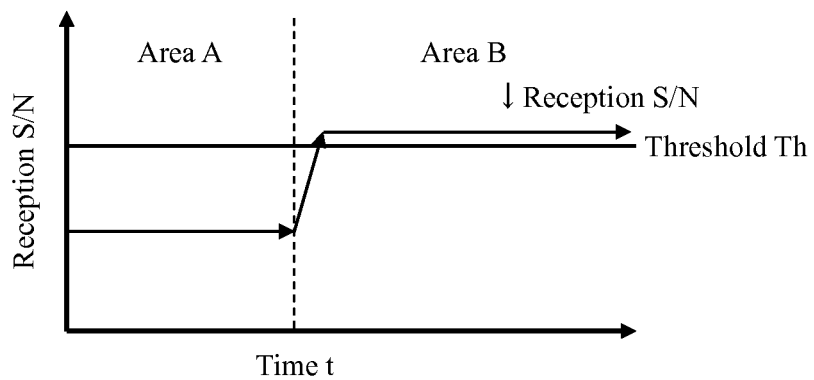
FIG. 5 is an explanatory drawing showing a state in which the S/N ratio of a received signal is constantly lower than a threshold Th during a time period (area A) during which the S/N ratio is measured, the time period being set by the user.

FIG. 5 shows a state in which the S/N ratio of the received signal is constantly lower than the threshold Th during a time period (area A) during which the S/N ratio is measured, the time period being set by the user. This state is a one in which the input signal is constantly insufficient.

Figure 6:
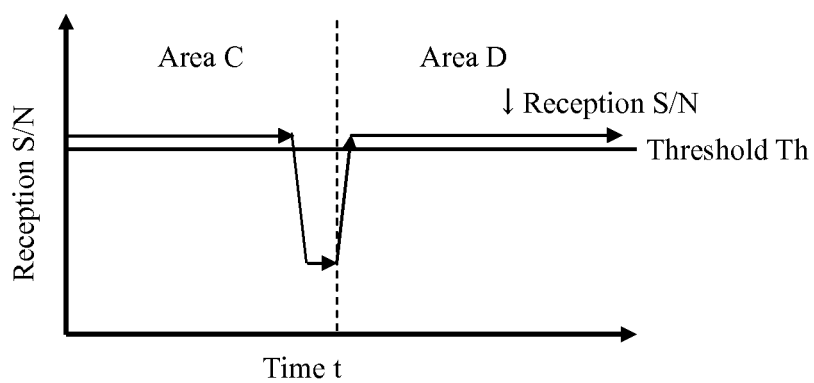
FIG. 6 is an explanatory drawing showing a state in which the S/N ratio of the received signal decreases temporarily and, after then becoming lower than the threshold Th, becomes higher than the threshold Th during a time period (area A) during which the S/N ratio is measured, the time period being set by the user.

FIG. 6 shows a state in which the S/N ratio of the received signal decreases temporarily and, after then becoming lower than the threshold Th, becomes higher than the threshold Th during a time period (area C) during which the S/N ratio is measured, the time period being set by the user. This state can be considered in which a certain object is crossing the propagation path of the laser light.

Figure 7:
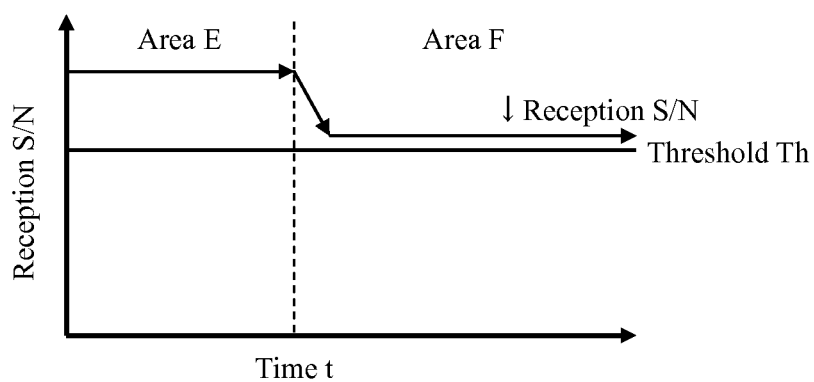
FIG. 7 is an explanatory drawing showing a state in which the S/N ratio of the received signal is constantly higher than the threshold Th during a time period (area A) during which the S/N ratio is measured, the time period being set by the user.

FIG. 7 shows a state in which the S/N ratio of the received signal is constantly higher than the threshold Th during a time period (area E) during which the S/N ratio is measured, the time period being set by the user. In this state, there is a possibility that although there is no problem from the viewpoint of the communication quality, the power consumption of the transmission system 1 is greater than necessary.

FIG. 8 is an explanatory drawing showing a relation between a state corresponding to the comparison result acquired by the S/N comparison circuit 13, and the setting details of the parameters.

Because the case in which the S/N ratio of the received signal is constantly lower than the threshold Th and the comparison result acquired by the S/N comparison circuit 13 shows the state of FIG. 5 is in a state in which the input signal is constantly insufficient, the parameter setting circuit 14 of the communication device B sets the parameters for laser light in such a way that the output power $P_P$ of the laser light increases, as shown in FIG. 8.

In the case of a fiber laser using a fiber amplifier, the output power $P_P$ of the laser light is calculated from the average power $P_A$, the pulse width w, and the pulse repetition frequency f of the laser light, as shown in the following equation (4).

$$P_P = \frac{P_A}{wf} \quad (4)$$

Therefore, when increasing the output power $P_P$ of the laser light, a change is made to the settings of the parameters in such a way that all of the following control operations (1) to (3) or either one of the control operations is performed.
(1) Control operation of increasing the average power $P_A$
(2) Control operation of narrowing the pulse width w
(3) Control operation of lowering the repetition frequency f Although the example of increasing the output power $P_P$ Of the laser light by performing all or either one of the control operations (1) to (3) is shown above, the power per unit area can be increased by decreasing the beam diameter or the angle of divergence of the laser light.

In contrast, in the case of a semiconductor laser, the output power can be increased by increasing the amount of input current.

When the S/N ratio of the received signal decreases temporarily and the comparison result acquired by the S/N comparison circuit 13 shows the state of FIG. 6, because it can be assumed that a certain object is crossing the propagation path of the laser light, the parameter setting circuit 14 of the communication device B sets the parameters for laser light in such away that the beam diameter or the angle of divergence of the laser light increases (or both the beam diameter and the angle of divergence increase), as shown in FIG. 8.

Although by increasing the beam diameter or the angle of divergence of the laser light, a reduction in the S/N ratio can be prevented even if there occurs a state in which a certain object crosses the propagation path of the laser light, when the S/N ratio does not become higher than the threshold Th even if the beam diameter or the angle of divergence of the laser light is increased, the parameters for laser light are set in such a way that the output power $P_P$ of the laser light increases.

Because when the S/N ratio of the received signal is constantly higher than the threshold Th and the power consumption of the transmission system 1 is higher than a preset permissible value, and therefore the comparison result acquired by the S/N comparison circuit 13 shows the state of FIG. 7, the communication device B is in a state in which the power consumption is excessive, the parameter setting circuit 14 of the communication device B sets the parameters for laser light in such a way that the output power $P_P$ of the laser light decreases, as shown in FIG. 8.

When decreasing the output power $P_P$ of the laser light, a change is made to the settings of the parameters in such a way that all of the following control operations (1) to (3) or either one of the control operations is performed.
(1) Control operation of decreasing the average power $P_A$
(2) Control operation of widening the pulse width w
(3) Control operation of raising the repetition frequency f Although the example of decreasing the output power $P_P$ of the laser light by performing all or either one of the control operations (1) to (3) is shown above, the power per unit area can be decreased by increasing the beam diameter or the angle of divergence of the laser light.

Because there is a possibility that an abnormality occurs when the number of times that the parameters have been set is larger than the number of times which is specified by the user, the parameter setting circuit 14 sends an alarm to the user (step ST32).

When the parameter setting circuit 14 makes a change to the settings of the parameters, the light source 2 of the communication device B outputs laser light (laser light having the average power $P_A$, the pulse width w, and the pulse repetition frequency f corresponding to the parameters whose settings have been changed) according to the parameters whose settings have been changed, and the optical modulator 3 modulates the intensity of the laser light outputted from the light source 2 according to the RF signal provided therefor from outside the optical modulator.

Further, the transmission optical system 5 adjusts the beam diameter and the divergence of the laser light according to the parameters whose settings have been changed, and radiates the laser light (communication signal) after adjustment toward the communication device A (step ST33).

When the communication device B continues the communications with the communication device A (step ST34), the communication device B returns to the process of step ST24 and repeats the processes of steps ST24 to ST34.

After the communication device A has radiated the laser light, the signal processing circuit 11 of the communication device A has been on standby until laser light (communication signal) is radiated from the communication device B (step ST5 of FIG. 2), and, when the reception optical system 6 does not receive the laser light (communication signal) (step ST6), determines whether the number of times that the signal processing circuit has been on standby until receiving the laser light (communication signal) reaches the number of times which is specified by the user (step ST7), and sends an alarm to the user when the number of times that the signal processing circuit has been on standby reaches the specified number of times.

After the laser light (communication signal) is radiated from the communication device B and the reception optical system 6 receives the laser light (communication signal) (step ST6), the light receiver 8 of the communication device A converts the laser light into an electric signal (received signal).

When receiving the received signal which is the electric signal from the light receiver 8, the amplifier 9 of the communication device A amplifies the signal level of the received signal to the desired level.

The demodulator 10 of the communication device A demodulates the received signal which is amplified by the amplifier 9 to extract the communication data piggybacked onto the laser light radiated from the communication device B and output the communication data (step ST8).

When the communication device A continues the communications with the communication device B (step ST9), the communication device A shifts to a process of step ST10.

When receiving the received signal after amplification from the amplifier 9, the S/N calculation circuit 12 of the communication device A measures the peak voltage of the received signal and calculates the S/N ratio of the received signal according to the result of the measurement (step ST10), like the S/N calculation circuit 12 of the communication device B.

After the S/N calculation circuit 12 calculates the S/N ratio of the received signal, the S/N comparison circuit 13 of the communication device A compares the S/N ratio with the threshold Th and outputs the result of the comparison to the parameter setting circuit 14 (step ST11), like the S/N comparison circuit 13 of the communication device B.

The parameter setting circuit 14 of the communication device A sets the parameters for laser light according to the comparison result acquired by the S/N comparison circuit 13, thereby controlling the radiation state of the laser light radiated from the transmission optical system 5 (steps ST11 to ST13), like the parameter setting circuit 14 of the communication device B.

Because there is a possibility that an abnormality occurs when the number of times that the parameters have been set is larger than the number of times which is specified by the user, the parameter setting circuit 14 sends an alarm to the user (step ST14).

After that, the communication device returns to the process of step ST3 and repeats the processes of steps ST3 to ST14.

As can be seen from the above description, because each communication device in accordance with this Embodiment 1 is configured in such a way that the S/N calculation circuit 12 to calculate the S/N ratio of the received signal and the S/N comparison circuit 13 to compare the S/N ratio calculated by the S/N calculation circuit 12 with the threshold Th are disposed, and the parameter setting circuit 14 controls the radiation state of the beam radiated from the transmission optical system 5 according to the result of the comparison performed by the S/N comparison circuit 13, there is provided an advantage of being able to prevent degradation in the communication quality and achieve communicative stabilization even if the state of the propagation environment gets worse.

More specifically, the communication state can be optimized in real time according to the state of the propagation environment, and stable bidirectional communications can be ensured. Further, by controlling the transmission power according to the S/N ratio, lower power consumption can be achieved.

Embodiment 2

Although the example in which each of the communication devices A and B calculates the S/N ratio of the received signal thereof and controls the radiation state of the beam radiated from the transmission optical system 5 according to the S/N ratio is shown in above-mentioned Embodiment 1, the communication system can be alternatively configured in such a way that, for example, after the communication device A calculates the S/N ratio of the received signal at the time of controlling the radiation state of the beam, S/N information (signal to noise ratio information) showing the S/N ratio is included in communication data and the optical modulator 3 of the transmission system 1 then modulates laser light onto which the above-mentioned communication data are piggybacked, so that the transmission optical system 5 radiates this laser light toward the communication device B.

In this case, the communication device B does not perform the process of calculating the S/N ratio of the received signal, and the parameter setting circuit 14 acquires the S/N information included in the communication data extracted by the demodulator 10, and controls the radiation state of the beam radiated from the transmission optical system 5 according to the S/N ratio shown by the S/N information.

Although the example in which the communication device A radiates laser light onto which communication data including the S/N information are piggybacked toward the communication device B is shown above, the communication system can be alternatively configured in such a way that after the communication device B calculates the S/N ratio of the received signal at the time of controlling the radiation state of the beam, the S/N information showing the S/N ratio is included in communication data and the optical modulator 3 of the transmission system 1 then modulates laser light onto which the above-mentioned communication data are piggybacked, so that the transmission optical system 5 radiates this laser light toward the communication device A.

In this case, the communication device A does not perform the process of calculating the S/N ratio of the received signal, and the parameter setting circuit 14 acquires the S/N information included in the communication data extracted by the demodulator 10, and controls the radiation state of the beam radiated from the transmission optical system 5 according to the S/N ratio shown by the S/N information.

By thus configuring one of the communication devices in such a way that the communication device radiates laser light onto which communication data including the S/N information are piggybacked toward the other communication device, there is provided an advantage of eliminating the necessity to perform the process of calculating the S/N ratio of the received signal in the other communication device and being able to achieve simplification of the configuration and a reduction in the processing load.

Embodiment 3

Although the example in which when changing the settings of the parameters, each of the communication devices A and B controls the radiation state of the beam according to the parameters whose settings have been changed is shown in above-mentioned Embodiment 1, the communication system can be alternatively configured in such a way that, for example, when the communication device A changes the settings of the parameters, parameter information (beam radiation state information) showing the parameters whose settings have been changed is included in communication data and the optical modulator 3 of the transmission system 1 then modulates laser light onto which the above-mentioned communication data are piggybacked, so that the transmission optical system 5 radiates this laser light toward the communication device B.

In this case, the communication device B does not perform the process of calculating the S/N ratio of the received signal and the process of comparing the S/N ratio with the threshold Th, and the parameter setting circuit 14 acquires the parameter information included in the communication data extracted by the demodulator 10, and controls the radiation state of the beam radiated from the transmission optical system 5 according to the parameters shown by the parameter information.

Although the example in which the communication device A radiates laser light onto which communication data including the parameter information are piggybacked toward the communication device B is shown above, the communication system can be alternatively configured in such a way that when the communication device B changes the settings of the parameters, parameter information showing the parameters whose settings have been changed is included in communication data and the optical modulator 3 of the transmission system 1 then modulates laser light onto which the above-mentioned communication data are piggybacked, so that the transmission optical system 5 radiates this laser light toward the communication device A.

In this case, the communication device A does not perform the process of calculating the S/N ratio of the received signal and the process of comparing the S/N ratio with the threshold Th, and the parameter setting circuit 14 acquires the parameter information included in the communication data extracted by the demodulator 10, and controls the radiation state of the beam radiated from the transmission optical system 5 according to the parameters shown by the parameter information.

Figure 9:
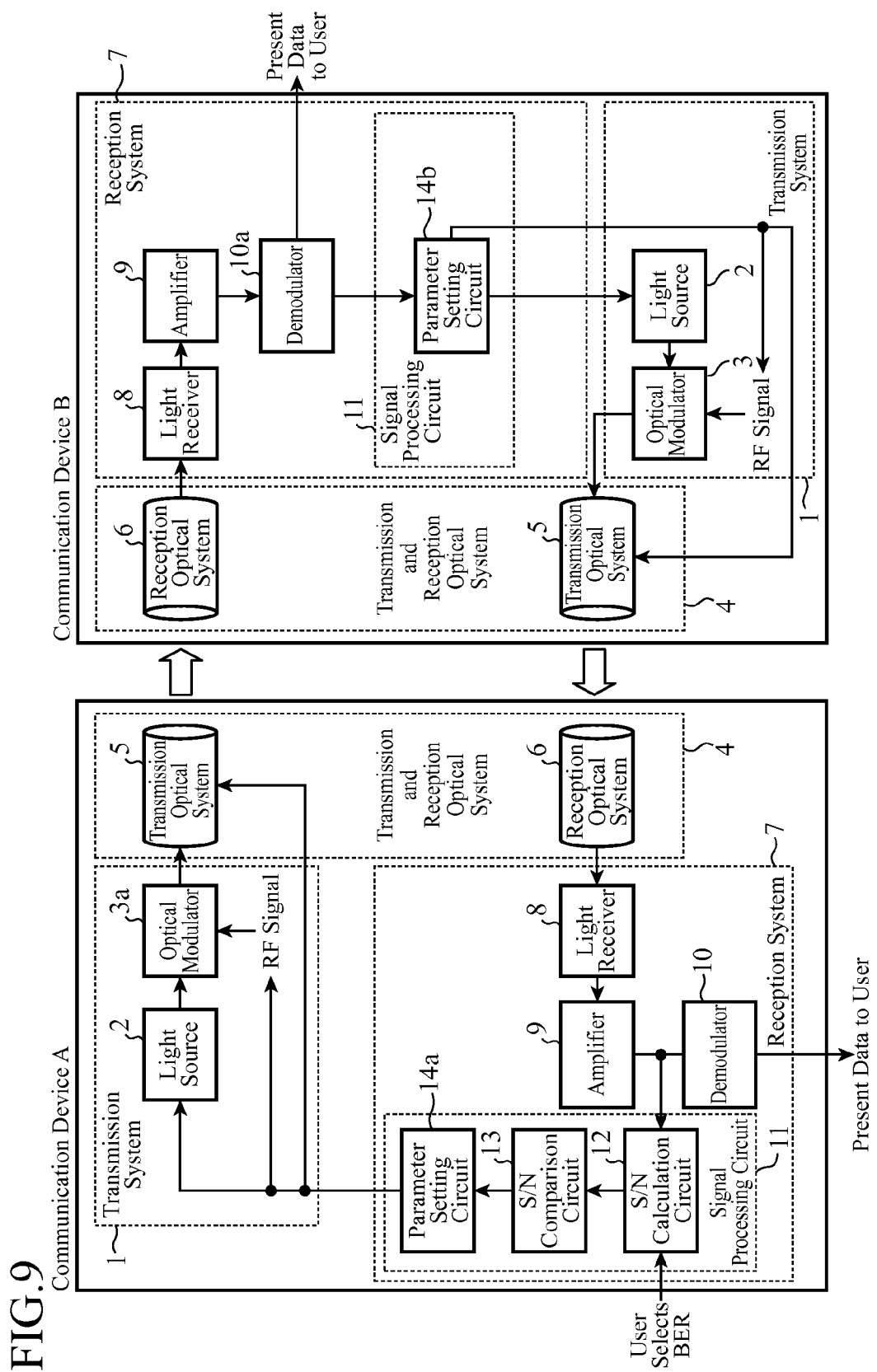
FIG. 9 is a configuration diagram showing a bidirectional communication system in accordance with Embodiment 3 of the present invention.

FIG. 9 is a configuration diagram showing a bidirectional communication system in the case in which the communication device A radiates laser light onto which communication data including the parameter information are piggybacked toward the communication device B. In the figure, because the same reference numerals as those shown in FIG. 1 denote the same components or like components, the explanation of the components will be omitted hereafter.

A parameter setting circuit 14a of the communication device A is configured with, for example, either a semiconductor integrated circuit equipped with a CPU or a one chip microcomputer, and performs, in addition to a process of controlling the radiation state of laser light radiated from a transmission optical system 5 by setting parameters for laser light according to the result of a comparison performed by an S/N comparison circuit 13, like the parameter setting circuit 14 shown in FIG. 1, and a process of including the parameter information (beam radiation state information) showing the parameters in communication data. The parameter setting circuit 14a constructs a beam radiation state controller.

An optical modulator 3a of the communication device A performs a process of modulating the intensity of laser light outputted from a light source 2 according to an RF signal provided therefor from outside the optical modulator, like the optical modulator 3 shown in FIG. 1, and the communication data piggybacked onto this laser light include the parameter information.

A demodulator 10a of the communication device B performs a process of demodulating a received signal which is amplified by an amplifier 9 to extract the communication data piggybacked onto the laser light radiated from the communication device B, and output the communication data, like the demodulator 10 shown in FIG. 1.

The demodulator 10a also performs a process of outputting the parameter information included in the communication data piggybacked onto the laser light to a parameter setting circuit 14b. The demodulator 10a constructs a signal demodulator.

The parameter setting circuit 14b is configured with, for example, either a semiconductor integrated circuit equipped with a CPU or a one chip microcomputer, and performs a process of controlling the radiation state of laser light radiated from a transmission optical system 5 by setting the parameters for laser light according to the parameter information outputted from the demodulator 10a.

The parameter setting circuit 14b constructs a beam radiation state controller.

Next, operations will be explained.

Figure 10:
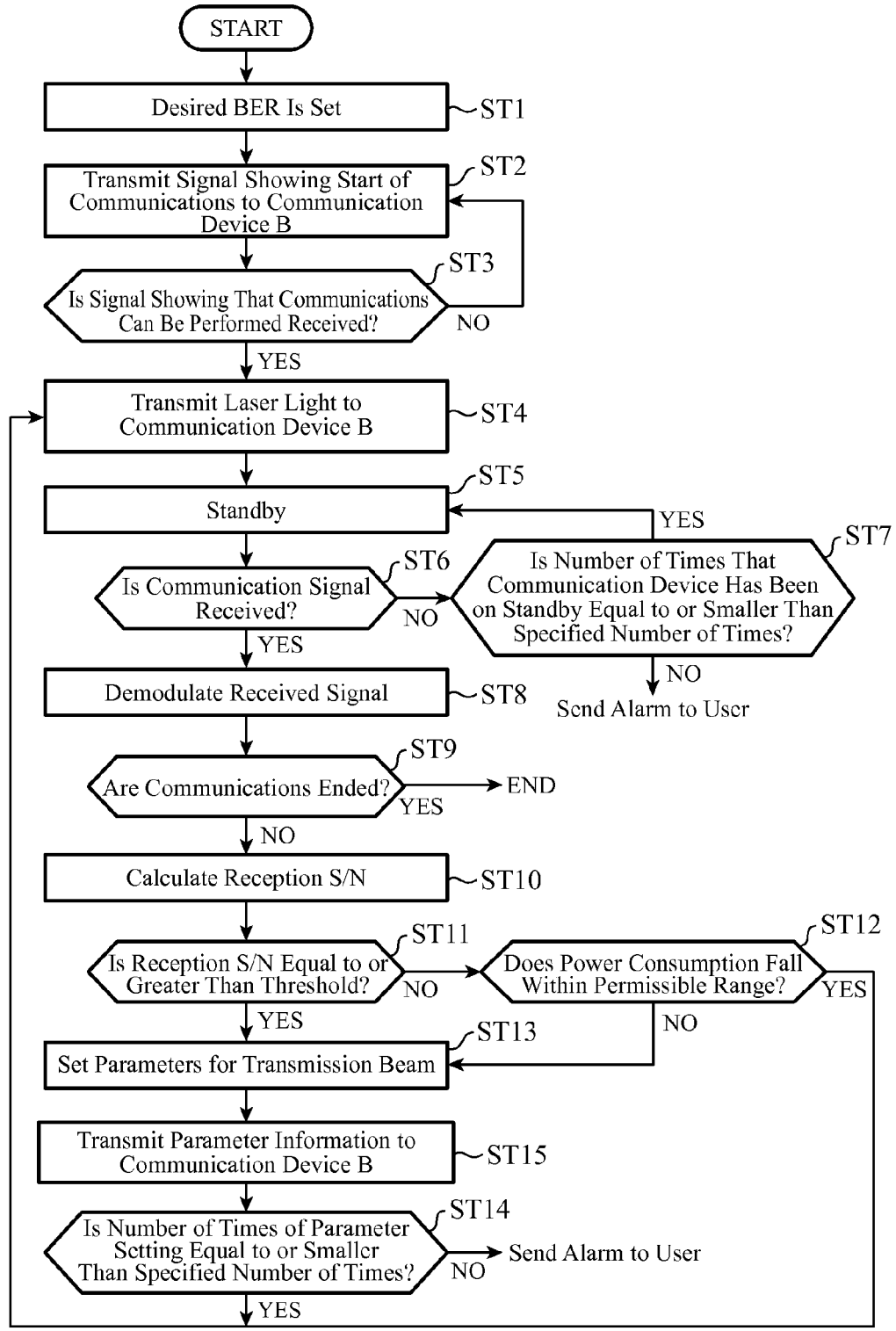
FIG. 10 is a flow chart showing the details of processing performed by a communication device A in accordance with Embodiment 3 of the present invention.

FIG. 10 is a flowchart showing the details of processing performed by the communication device A in accordance with Embodiment 3 of the present invention.

Figure 11:
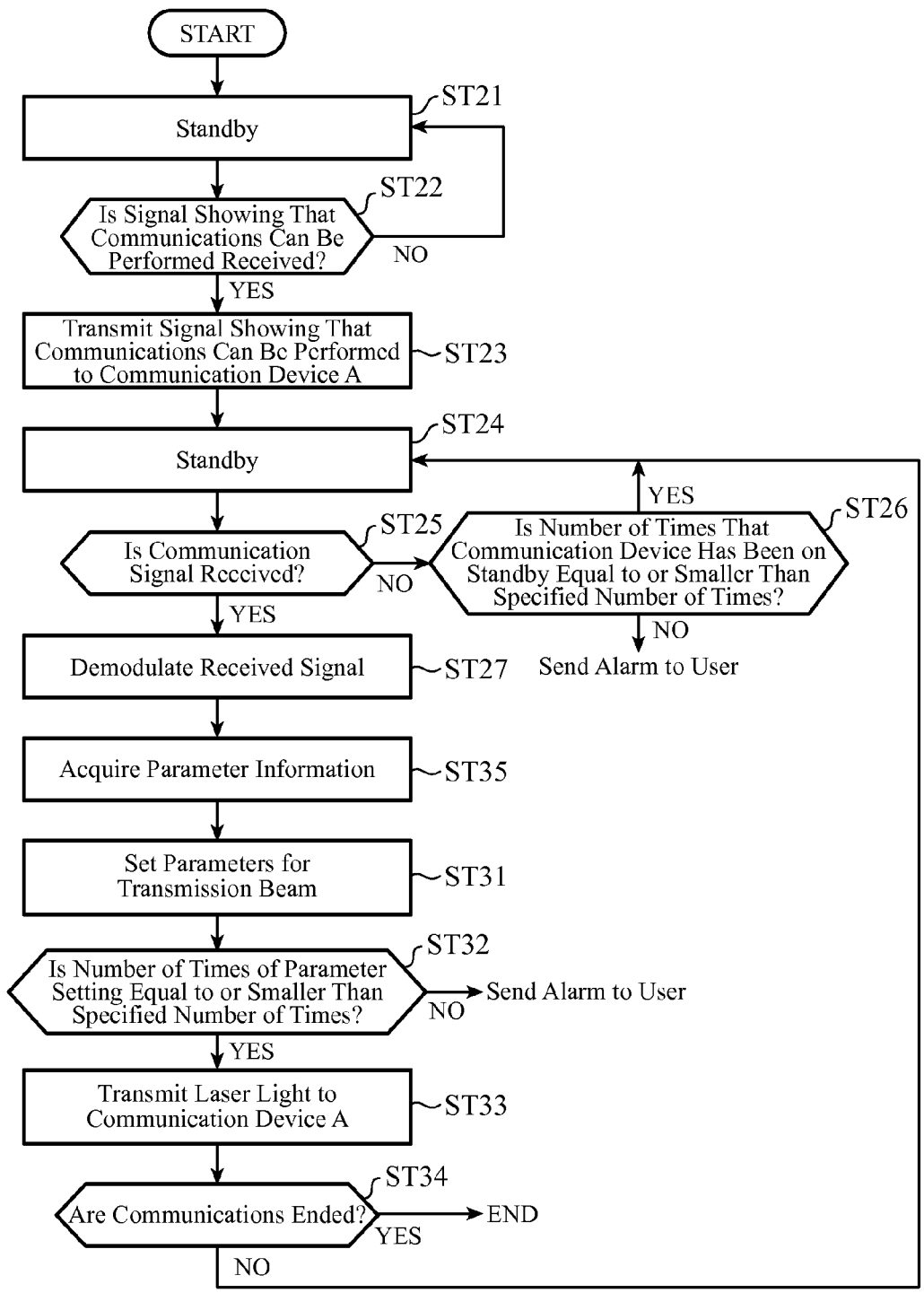
FIG. 11 is a flow chart showing the details of processing performed by a communication device B in accordance with Embodiment 3 of the present invention.

FIG. 11 is a flowchart showing the details of processing performed by the communication device B in accordance with Embodiment 3 of the present invention.

Hereafter, only the details of processings different from those in accordance with above-mentioned Embodiment 1 will be explained.

The communication device A controls the radiation state of laser light radiated from the transmission optical system 5 by setting the parameters for laser light, like that in accordance with above-mentioned Embodiment 1.

The parameter setting circuit 14a of the communication device A performs the process of including the parameter information showing the parameters in communication data, in addition to the process of setting the parameters for laser light according to a comparison result acquired by the S/N comparison circuit 13.

The optical modulator 3a of the communication device A modulates the intensity of the laser light onto which the communication data in which the parameter information is included by the parameter setting circuit 14a are piggybacked.

As a result, the laser light onto which the communication data including the parameter information are piggybacked is radiated from the transmission optical system 5 of the communication device A toward the communication device B (step ST15 of FIG. 10).

The communication device B performs neither a process of calculating the S/N ratio of the received signal nor a process of comparing the S/N ratio with the threshold Th, unlike that in accordance with above-mentioned Embodiment 1.

The demodulator 10a of the communication device B demodulates the received signal which is amplified by the amplifier 9 to extract the communication data piggybacked onto the laser light radiated from the communication device A, and output the communication data to outside the communication device (step ST27 of FIG. 11), like the demodulator 10 shown in FIG. 1.

The demodulator 10a also outputs the parameter information included in the communication data piggybacked onto the laser light to the parameter setting circuit 14b (step ST35).

When receiving the parameter information from the demodulator 10a, the parameter setting circuit 14b of the communication device B controls the radiation state of laser light radiated from the transmission optical system 5 by setting the parameters shown by the parameter information (step ST31).

As can be seen from the above description, because the communication system in accordance with this Embodiment 3 is configured in such a way that one of the communication devices radiates laser light onto which communication data including the parameter information are piggybacked toward the other communication device, the same advantages as those provided by above-mentioned Embodiment 1 are provided. In addition, because the process of calculating the S/N ratio of the received signal and the process of comparing the S/N ratio with the threshold Th become unnecessary in the other communication device, there is provided an advantage of being able to achieve simplification of the configuration and a reduction of the processing load. There is provided another advantage of being able to achieve a reduction in the communication control time and a reduction in the power consumption.

Embodiment 4

Although the bidirectional communication system in which the communication device A and the communication device B perform bidirectional communications with each other is explained in above-mentioned Embodiments 1 to 3, a bidirectional communication system in which one-way communications from a communication device A to a communication device B are performed will be explained in this Embodiment 4.

Figure 12:
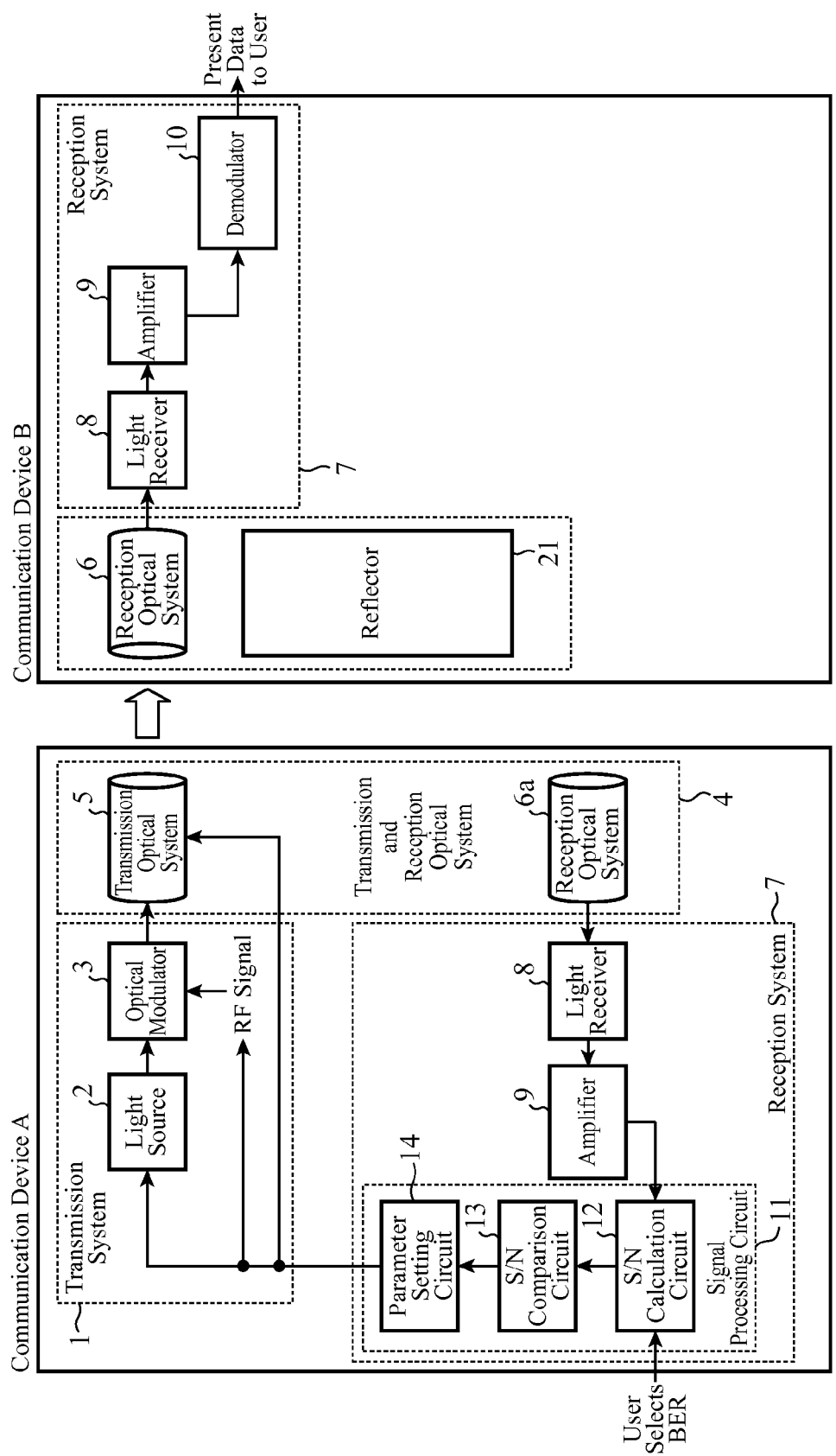
FIG. 12 is a configuration diagram showing a one-way communication system in accordance with Embodiment 4 of the present invention.

FIG. 12 is a configuration diagram showing the one-way communication system in accordance with Embodiment 4 of the present invention. In the figure, because the same reference numerals as those shown in FIG. 1 denote the same components or like components, the explanation of the components will be omitted hereafter.

A reception optical system 6a of the communication device A is configured with a reception lens and so on, and has a function of receiving laser light which is reflected by a communication device B and then returns thereto after being radiated from a transmission optical system 5 of the communication device A, and then focusing the laser light onto a light receiver 8. The reception optical system 6a constructs a beam receiver.

A reflector 21 of the communication device B is configured with, for example, a corner reflector or the like, and has a function of reflecting the laser light radiated from the communication device A.

Next, operations will be explained.

Figure 13:
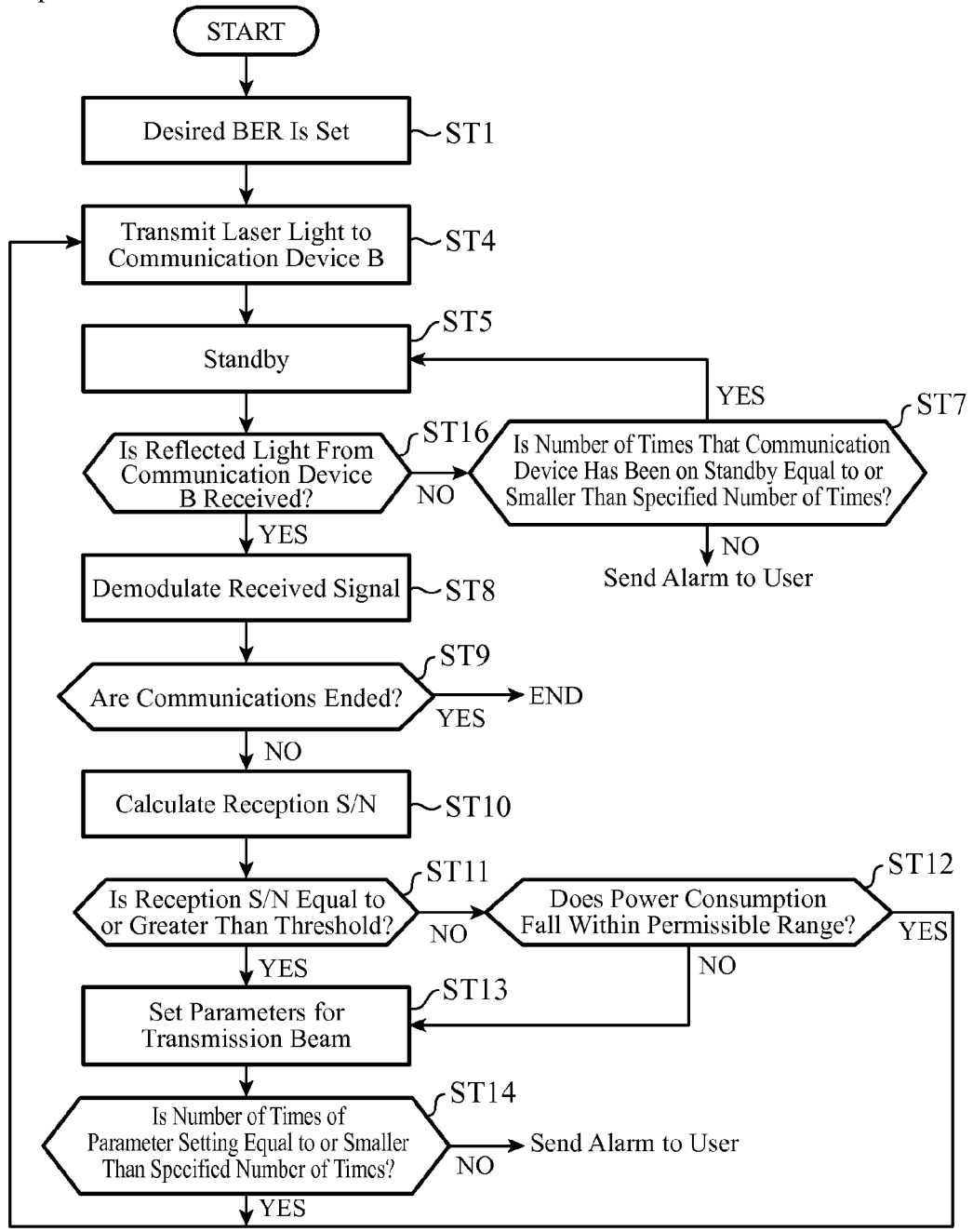
FIG. 13 is a flow chart showing the details of processing performed by a communication device A in accordance with Embodiment 4 of the present invention.

FIG. 13 is a flow chart showing the details of processing performed by the communication device A in accordance with Embodiment 4 of the present invention.

Figure 14:
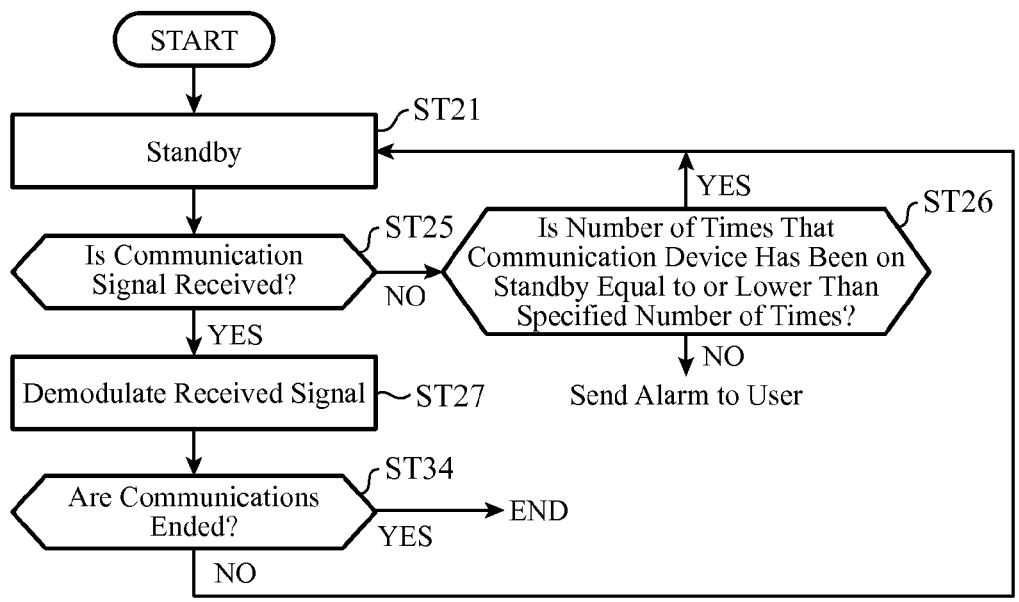
FIG. 14 is a flow chart showing the details of processing performed by a communication device B in accordance with Embodiment 4 of the present invention.

FIG. 14 is a flow chart showing the details of processing performed by the communication device B in accordance with Embodiment 4 of the present invention.

First, a user selects a desired BER.

The desired BER selected by the user is set to an S/N calculation circuit 12 of the communication device A (step ST1 of FIG. 13).

After the desired BER is set, the S/N calculation circuit 12 of the communication device A determines a threshold Th for an S/N ratio on the basis of the BER, like that in accordance with above-mentioned Embodiment 1.

Because a maximum transmission capacity C can be calculated from the threshold for the S/N ratio, as shown in the equation (2), the maximum transmission capacity C can be presented to the user.

A light source 2 of the communication device A outputs laser light according to parameters which are set initially by a parameter setting circuit 14, and an optical modulator 3 modulates the intensity of the laser light outputted from the light source 2 according to an RF signal provided therefor from outside the optical modulator.

Further, a transmission optical system 5 adjusts the beam diameter and the divergence of the laser light according to the parameters which are set initially, and radiates the laser light (communication signal) after adjustment to the communication device B (step STST4).

It is assumed that a divergence including the reflector 21 is always set as a lower limit on the divergence of the laser light.

A signal processing circuit 11 of the communication device B has been on standby until laser light (communication signal) is radiated from the communication device A (step ST21 of FIG. 14), and, when a reception optical system 6 does not receive the laser light (communication signal) (step ST25), determines whether the number of times that the signal processing circuit has been on standby until receiving the laser light (communication signal) reaches the number of times which is specified by the user (step ST26), and sends an alarm to the user when the number of times that the signal processing circuit has been on standby reaches the specified number of times.

After the laser light (communication signal) is radiated from the communication device A, and the reception optical system 6 receives this laser light (communication signal) (step ST25), a light receiver 8 of the communication device B converts the laser light into an electric signal (received signal).

After the received signal which is the electric signal is outputted from the light receiver 8, an amplifier 9 of the communication device B amplifies the signal level of the received signal to a desired level.

A demodulator 10 of the communication device B demodulates the received signal which is amplified by the amplifier 9 to extract communication data piggybacked onto the laser light radiated from the communication device B, and output the communication data (step ST27).

When continuing the communications with the communication device A (step ST34), the communication device B returns to the process of step ST21 and repeats the processes of steps ST21 to ST34.

A part of the laser light (communication signal) radiated from the communication device A is reflected by the reflector 21 of the communication device B and then returns to the communication device A.

After radiating the laser light (communication signal), the signal processing circuit 11 of the communication device A has been on standby until laser light is reflected by the communication device B and then returns to the communication device A (step ST5 of FIG. 13), and, when the reception optical system 6a does not receive the laser light (communication signal) which is reflected light (step ST16), determines whether the number of times that the signal processing circuit has been on standby until receiving the laser light (communication signal) reaches the number of times which is specified by the user (step ST7), and sends an alarm to the user when the number of times that the signal processing circuit has been on standby reaches the specified number of times.

After laser light is reflected by the communication device B and the reception optical system 6a receives this laser light (communication signal) (step ST16), a light receiver 8 of the communication device A converts the laser light into an electric signal (received signal).

When receiving the received signal which is the electric signal from the light receiver 8, an amplifier 9 of the communication device A amplifies the signal level of the received signal to a desired level.

When continuing the communications with the communication device B (step ST9), the communication device A shifts to a process of step ST10.

When receiving the received signal after amplification from the amplifier 9, the S/N calculation circuit 12 of the communication device A measures the peak voltage of the received signal and calculates the S/N ratio of the received signal according to the result of the measurement (step ST10), like that in accordance with above-mentioned Embodiment 1.

Figure 15:
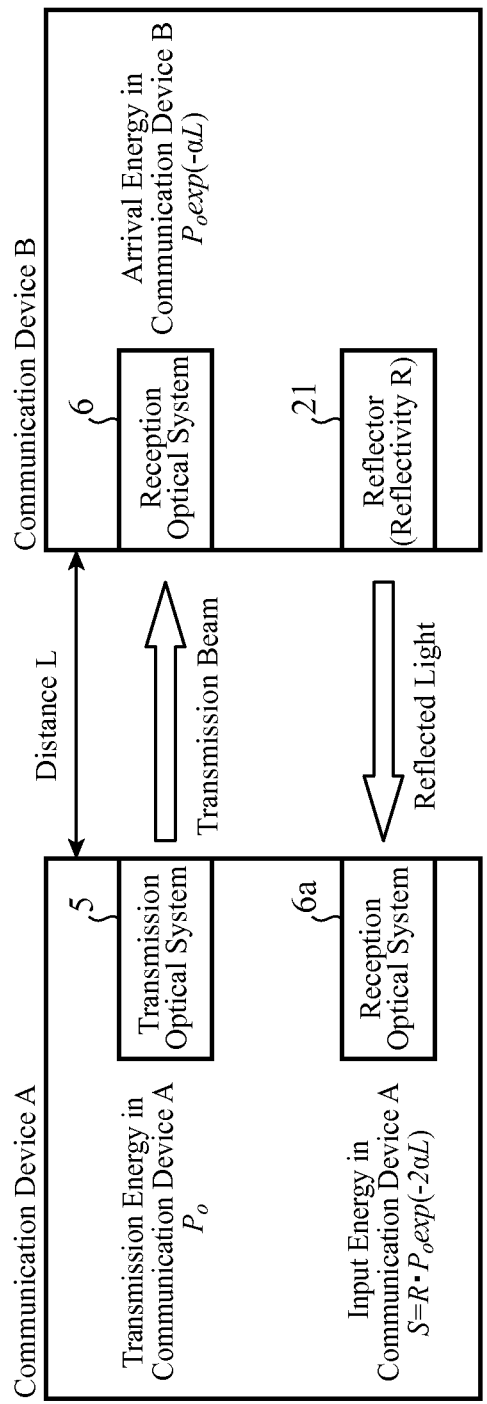
FIG. 15 is an explanatory drawing showing energy in each optical system in the communication device.

However, because the laser light which the communication device A receives is laser light which is reflected by the communication device B and then returns to the communication device A, the propagation distance of the laser light is twice the distance to the communication device B, as shown in FIG. 15, and hence its attenuation is large.

Therefore, because the signal strength of the laser light which the communication device A receives is lower than the signal strength of the laser light which the communication device B receives, when the communication device A compares the S/N ratio of the received signal with the threshold Th, it is necessary to change the signal strength of the laser light which the communication device A receives into a value equivalent to the signal strength of the laser light which the communication device B receives.

Changing the signal strength of the laser light into an equivalent value can be performed according to the following equation (5).

$$V'_S = \sqrt{\frac{R \cdot P_0}{R_{rec}}} \times V_S \qquad (5)$$

In the equation (5), $V_S'$ denotes the voltage of the signal which is received by the communication device B, R denotes the reflectivity of the reflector 21, $P_0$ denotes the transmission energy in the transmission optical system 5 of the communication device A, $V_S$ denotes the voltage of the reflected light which is received by the communication device A, and $R_{rec}$ denotes the impedance of the light receiver 8 of the communication device A.

The S/N calculation circuit 12 of the communication device A calculates the S/N ratio of the received signal by substituting the signal voltage $V_S'$, instead of the signal voltage $V_S$, into the equation (3).

After the S/N calculation circuit 12 calculates the S/N ratio of the received signal, an S/N comparison circuit 13 of the communication device A compares the S/N ratio with the threshold Th and outputs the result of the comparison to the parameter setting circuit 14 (step ST11), like that in accordance with above-mentioned Embodiment 1.

The parameter setting circuit 14 of the communication device A sets the parameters for laser light according to the comparison result acquired by the S/N comparison circuit 13, thereby controlling the radiation state of the laser light radiated from the transmission optical system 5 (steps ST11 to ST13), like that in accordance with above-mentioned Embodiment 1.

Because there is a possibility that an abnormality occurs when the number of times that the parameters have been set is larger than the number of times which is specified by the user, the parameter setting circuit 14 sends an alarm to the user (step ST14).

After that, the communication device returns to the process of step ST4 and repeats the processes of steps ST4 to ST14.

As can be seen from the above description, because the communication system in accordance with this Embodiment 4 is configured in such a way that the S/N calculation circuit 12 to calculate the S/N ratio of the received signal of laser light which is reflected by the communication device B and then returns to the communication device A, and the S/N comparison circuit 13 to compare the S/N ratio calculated by the S/N calculation circuit 12 with the threshold Th are disposed, and the parameter setting circuit 14 controls the radiation state of the beam radiated from the transmission optical system 5 according to the result of the comparison performed by the S/N comparison circuit 13, there is provided an advantage of being able to prevent degradation of the communication quality and achieve stabilization of one-way communications even if the state of the propagation environment gets worse.

More specifically, even in the case of one-way communications, the communication state can be optimized in real time according to the state of the propagation environment, and stable bidirectional communications can be ensured. Further, by controlling the transmission power according to the S/N ratio, lower power consumption can be achieved.

Embodiment 5

Figure 16:
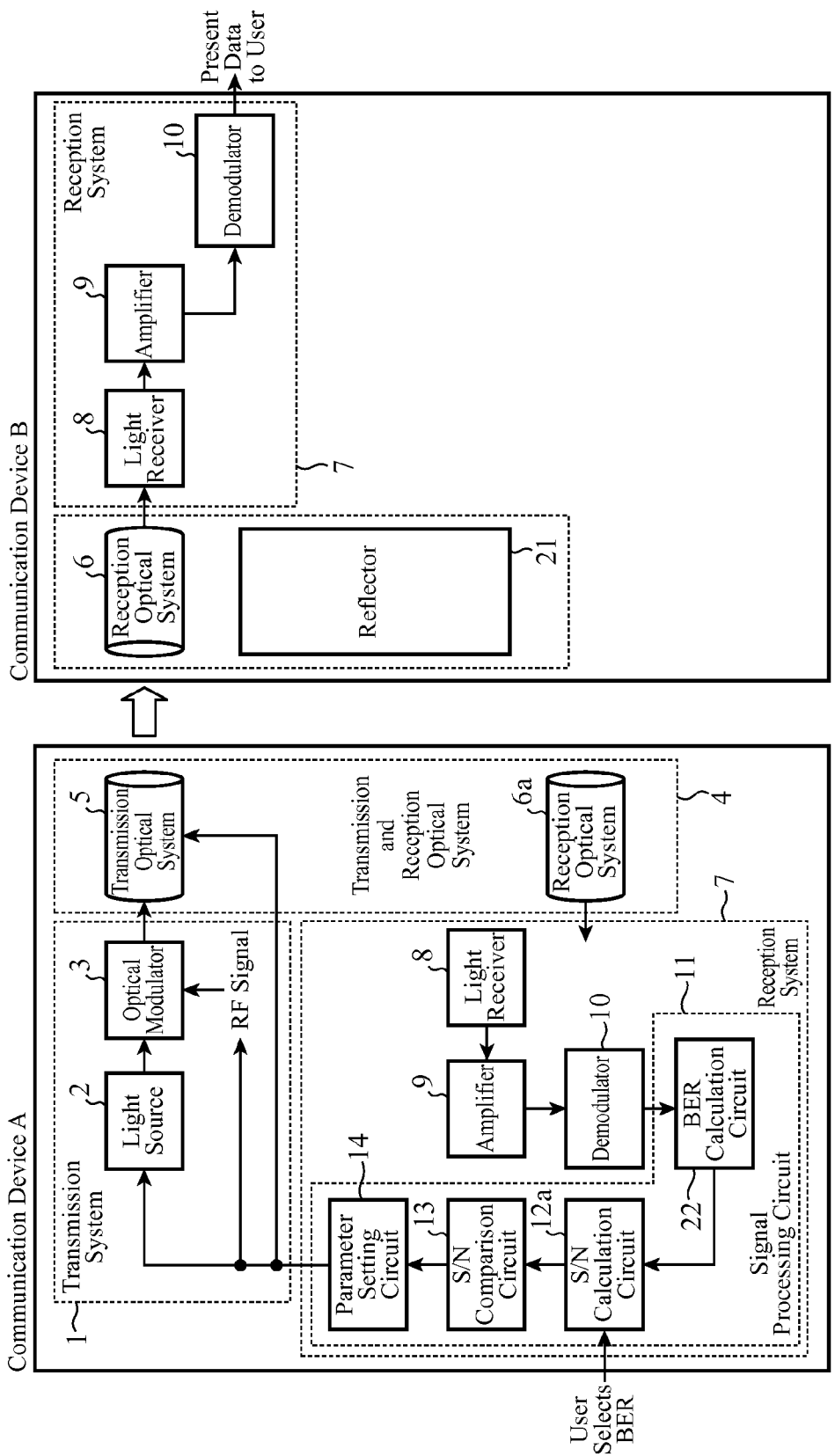
FIG. 16 is a configuration diagram showing a one-way communication system in accordance with Embodiment 5 of the present invention.

FIG. 16 is a configuration diagram showing a one-way communication system in accordance with Embodiment 5 of the present invention. In the figure, because the same reference numerals as those shown in FIG. 12 denote the same components or like components, the explanation of the components will be omitted hereafter.

A BER calculation circuit 22 of a communication device A is configured with, for example, either a semiconductor integrated circuit equipped with a CPU or a one chip microcomputer, and performs a process of calculating a BER (bit error rate) of a received signal by using both communication data piggybacked onto laser light radiated from a transmission optical system 5, and communication data extracted by a demodulator 10. The BER calculation circuit 22 constructs a bit error rate calculator.

An S/N calculation circuit 12a of the communication device A is configured with, for example, either a semiconductor integrated circuit equipped with a CPU or a one chip microcomputer, and performs a process of calculating the S/N ratio of the received signal from the BER calculated by the BER calculation circuit 22. The S/N calculation circuit 12a constructs a signal to noise ratio calculator.

Although the example in which the S/N calculation circuit 12 measures the peak voltage of the received signal after amplification which is outputted from the amplifier 9 and calculates the S/N ratio of the received signal according to the result of the measurement is shown in above-mentioned Embodiments 1 to 4, the BER calculation circuit 22 can calculate the BER of the received signal, and the S/N calculation circuit 12a can calculate the S/N ratio of the received signal from the BER calculated by the BER calculation circuit 22.

Concretely, the BER calculation circuit and the S/N calculation circuit operate as follows.

The BER calculation circuit 22 acquires the communication data (referred to as the "transmission data" from here on) piggybacked onto the laser light radiated from the transmission optical system 5, and also acquires the communication data (referred to as the "received data" hereafter) extracted by the demodulator 10.

The BER calculation circuit 22 compares the transmission data with the received data to count the number of error bits, and calculates the BER by dividing this number of error bits by the number of bits of the transmission data.

After the BER calculation circuit 22 calculates the BER, the S/N calculation circuit 12a calculates the S/N ratio of the received signal by substituting the BER into the above-mentioned equation (1).

Because the components other than the BER calculation circuit 22 and the S/N calculation circuit 12a are the same as those in accordance with any of above-mentioned Embodiments 1 to 4, the explanation of the components will be omitted hereafter.

As can be seen from the above description, because the communication system in accordance with this Embodiment 5 is configured in such a way that the BER calculation circuit 22 to calculate the BER of the received signal by using both the communication data piggybacked onto the laser light radiated from the transmission optical system 5 and the communication data extracted by the demodulator 10 is disposed, and the S/N calculation circuit 12a calculates the S/N ratio of the received signal from the BER calculated by the BER calculation circuit 22, there is provided an advantage of being able to eliminate the necessity to provide a peak hold circuit to measure the peak voltage of the received signal, and achieve simplification of the configuration, a reduction in the signal processing time, and a reduction in the power consumption.

Embodiment 6

In this Embodiment 6, a case in which a communication device in accordance with any of above-mentioned Embodiments 1 to 5 has an imaging function will be explained.

Figure 17:
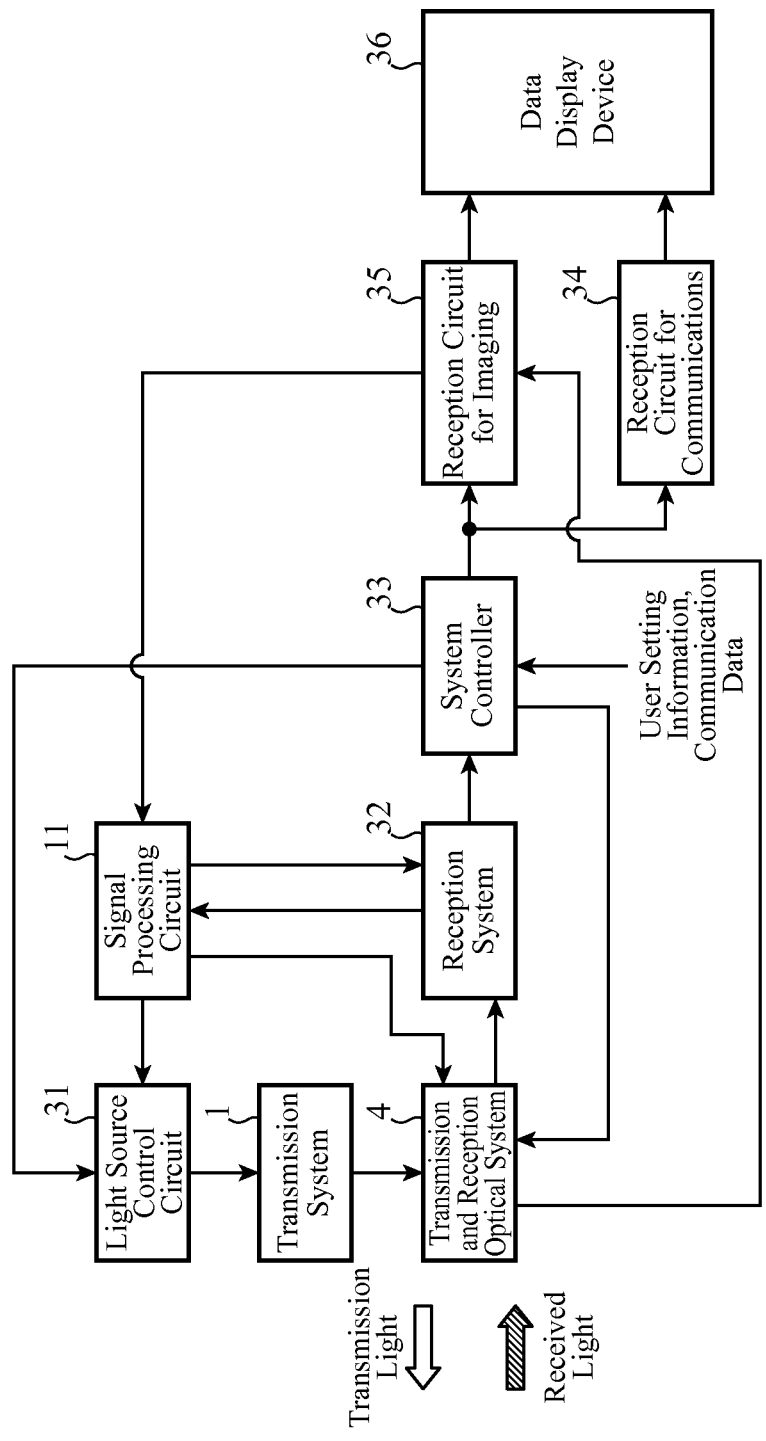
FIG. 17 is a configuration diagram showing a communication device in accordance with Embodiment 6 of the present invention.

FIG. 17 is a configuration diagram showing a communication device in accordance with Embodiment 6 of the present invention. In FIG. 17, because the same reference numerals as those shown in FIG. 1 denote the same components or like components, the explanation of the components will be omitted hereafter.

A light source control circuit 31 is configured with, for example, either a semiconductor integrated circuit equipped with a CPU or a one chip microcomputer, and performs a process of controlling the average power, the pulse repetition frequency, the pulse width, etc. of laser light from a light source 2 in a transmission system 1 under control by a signal processing circuit 11 or a system controller 33.

A reception system 32 is configured with a light receiver 8 and an amplifier 9 which are shown in FIG. 1, and so on, and performs a process of outputting a received signal amplified by the amplifier 9 to a signal processing circuit 11 and a system controller 33. The reception system 32 also performs gate switching time control.

The system controller 33 is configured with, for example, either a semiconductor integrated circuit equipped with a CPU or a one chip microcomputer, and performs a process of outputting the received signal outputted from the reception system 32 to at least one of a reception circuit 34 for communication and a reception circuit 35 for imaging according to a user's instruction.

The system controller 33 also performs a process of outputting a signal for controlling the angle of visibility and the orientation of a transmission and reception optical system 4, and a signal for setting the average power, the pulse repetition frequency, the pulse width, etc. of the laser light from the light source 2 according to the user's instruction. The system controller further performs a process of generating communication data according to the user's instruction.

The reception circuit 34 for communication is configured with a demodulator 10 shown in FIG. 1, and so on, and performs a process of demodulating the received signal outputted from the system controller 33 to extract communication data, and output the communication data to a data display device 36.

The reception circuit 35 for imaging is configured with, for example, either a semiconductor integrated circuit equipped with a CPU or a one chip microcomputer, and performs a process of measuring both a time which elapses after laser light is radiated from the transmission and reception optical system 4 until laser light is received by the transmission and reception optical system 4, and peak intensity, and generating a distance image and an intensity image about another communication device (e.g., a communication device installed in an airplane) which is a communications partner from the results of the measurement.

The reception circuit 35 for imaging also performs a process of calculating an attenuation coefficient of the laser light in the propagation space from the distance image and the intensity image.

It is assumed that the reception circuit 35 for imaging can measure a plurality of received pulses for each transmission pulse.

The reception circuit 35 for imaging constructs an image generator and an attenuation coefficient calculator.

The data display device 36 is configured with a liquid crystal display or the like, and performs a process of displaying the distance image and the intensity image which are generated by the reception circuit 35 for imaging, and the communication data outputted from the reception circuit 34 for communication.

Figure 19:
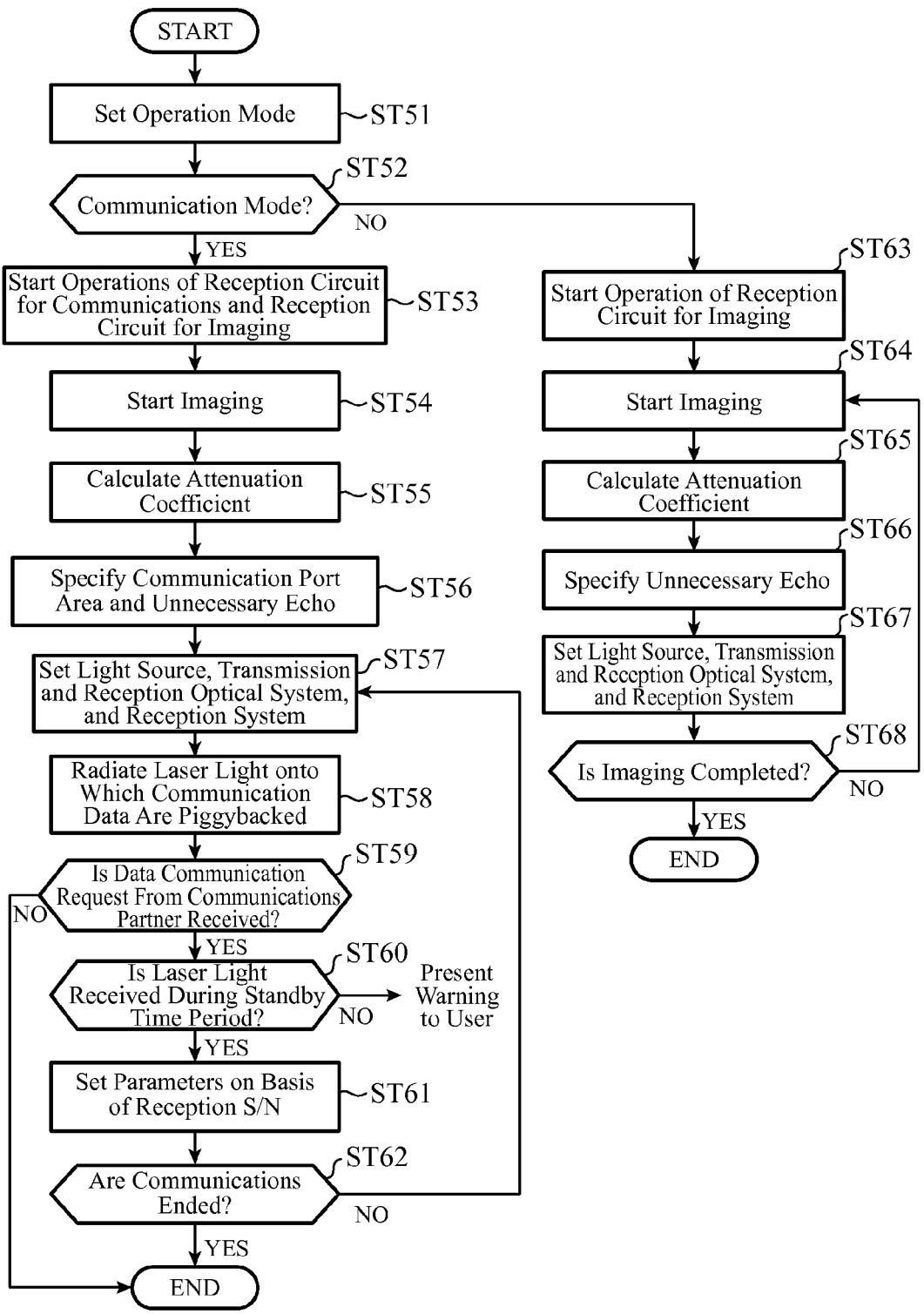
FIG. 19 is a flow chart showing the details of processing performed by the communication device in accordance with Embodiment 6 of the present invention.

FIG. 19 is a flowchart showing the details of processing performed by the communication device in accordance with Embodiment 6 of the present invention.

Figure 18:
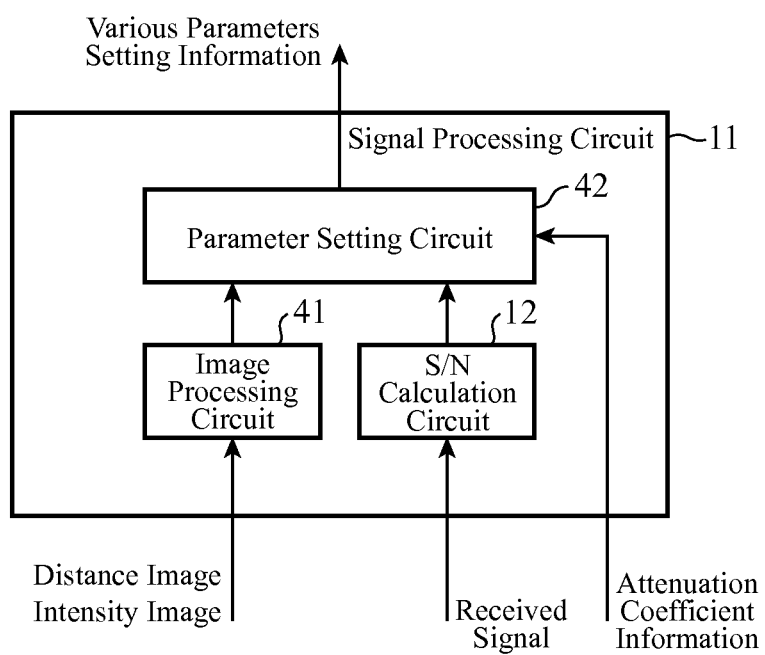
FIG. 18 is a configuration diagram showing a signal processing circuit of the communication device in accordance with Embodiment 6 of the present invention.

FIG. 18 is a configuration diagram showing the signal processing circuit of the communication device in accordance with Embodiment 6 of the present invention. In the figure, because the same reference numerals as those shown in FIG. 1 denote the same components or like components, the explanation of the components will be omitted hereafter.

The image processing circuit 41 is configured with a GPU (Graphics Processing Unit) and so on, and performs a process of specifying an object (e.g., a communication port in the other communication device which is a communications partner) which is included in the distance image and the intensity image, which are generated by the reception circuit 35 for imaging, and which is specified by the user, and also specifying an unnecessary echo.

A parameter setting circuit 42 has an S/N comparison circuit 13 shown in FIG. 1, and so on therein, and performs a process of controlling the radiation state of the laser light radiated by the transmission and reception optical system 4 by setting parameters for laser light on the basis of both the size of the communication port, which is specified by the image processing circuit 41, and the S/N ratio calculated by the S/N calculation circuit 12.

The parameter setting circuit 42 also performs a process of controlling the amplification by the amplifier 9 in the reception system. 32 on the basis of the attenuation coefficient of the laser light in the propagation space which is calculated by the reception circuit 35 for imaging.

A beam radiation state controller is configured with the image processing circuit 41 and the parameter setting circuit 42.

Next, operations will be explained.

First, a communication mode or an imaging mode is set, as the operation mode of the communication device, to the system controller 33 (step ST51).

This setting can be performed according to the user's instruction, or can be performed according to a command from a system in which the communication device shown in FIG. 17 is mounted.

When the communication mode is set (step ST52), the system controller 33 causes the reception circuit 34 for communication and the reception circuit 35 for imaging to start operating (step ST53).

The system controller 33 outputs a command to output pulse laser light having a constant repetition period to the light source control circuit 31 in order to start the imaging operation (step ST54).

When receiving the command to output pulse laser light having a constant repetition period from the system controller 33, the light source control circuit 31 generates a pulse signal having the constant repetition period and outputs the pulse signal to the transmission system 1.

When receiving the pulse signal having the constant repetition period from the light source control circuit 31, the transmission system 1 outputs pulse laser light on the basis of the pulse signal.

When receiving the pulse laser light from the transmission system 1, the transmission and reception optical system 4 adjusts the beam divergence and the orientation of the pulse laser light and also adjusts a receiving field-of-view angle according to an initial setting signal outputted from the system controller 33. In the control of the orientation in the imaging, a transmission and reception opening for laser light is operated within a range corresponding to the angle of view of one frame, at intervals of a predetermined driving angle.

The transmission and reception optical system 4 radiates the pulse laser light after adjustment toward space while causing a part of the pulse laser light to branch off to output this part to the reception circuit 35 for imaging.

Further, when the pulse laser light radiated toward space is reflected by the other communication device which is a communications partner and returns thereto, the transmission and reception optical system 4 receives the pulse laser light and focuses this pulse laser light onto the light receiver 8 within the reception system 32.

The light receiver 8 within the reception system 32 converts the pulse laser light which is reflected light into an electric signal (received signal), and causes a part of the received signal to branch off to output this part to the signal processing circuit 11. A received signal other than the part is amplified to a desired signal level by the amplifier 9, and, after that, is outputted to the reception circuit 35 for imaging.

At that time, in the amplification of the signal level of the received signal, by using an amplifier having a gain curve in which its amplification varies with time according to the attenuation coefficient of the propagation space, signal processing can be performed while a laser energy loss occurring in the propagation space is recovered. As a trigger signal for changing the degree of amplification, the part of laser light which is caused to branch off by the transmission and reception optical system 4 can be used.

The reception circuit 35 for imaging observes the received signal outputted from the reception system 32 when being triggered by the pulse laser light (transmission laser light) outputted from the transmission and reception optical system 4, thereby measuring the time (arrival time) which elapses after the pulse laser light is radiated from the transmission and reception optical system 4 until pulse laser light which is reflected light is received by the transmission and reception optical system 4, and the peak intensity.

After measuring the arrival time and the peak intensity of the reflected light, the reception circuit 35 for imaging generates a distance image and an intensity image about the other communication device which is a communications partner (e.g., a communication device installed in an airplane) from the measurement results, and outputs the distance image and the intensity image to the signal processing circuit 11. Further, the reception circuit for imaging displays the distance image and the intensity image on the data display device 36.

Because the process of generating a distance image and an intensity image from the measurement results of the arrival time and the peak intensity of the reflected light is a known technique, a detailed explanation of the process will be omitted hereafter.

Although the example in which the reception circuit 35 for imaging generates a distance image and an intensity image is shown above, when the measurement results for one frame are acquired, the reception circuit 35 for imaging can alternatively output the measurement results to the data display device 36 and the data display device 36 can generate a distance image and an intensity image from the above-mentioned measurement results.

Further, after measuring a plurality of received pulses for each transmission pulse, the reception circuit 35 for imaging calculates the attenuation coefficient α of the pulse laser light in the propagation space, as shown in the following equation (6) (step ST55).

$$\alpha = \frac{\log(V_2/V_1)}{-c(t_2 - t_1)} \quad (6)$$

In the equation (6), V denotes the reception voltage, t denotes the flight time, c denotes the speed of light, and subscripts 1 and 2 denote received signals 1 and 2, respectively.

When receiving the distance image and the intensity image from the reception circuit 35 for imaging, the image processing circuit 41 of the signal processing circuit 11 analyzes the distance image and the intensity image to specify an object (e.g., a communication port in the other communication device which is a communications partner) which is included in the distance image and the intensity image and which is specified by the user (step ST56).

For example, when a reflector serving as a marker exists in the communication port of the other communication device, the image processing circuit extracts a pixel group whose intensity is higher than a predetermined threshold (a threshold set by the user) from the intensity image if the size of the reflector is known, and calculates the three-dimensional size of a pixel group corresponding to that pixel group within the distance image and, when the three-dimensional size is substantially equal to the size of the reflector, determines an object associated with the pixel group to be the reflector. It is assumed that the reflector held by the other communication device which is a communications partner is sufficiently larger than floating scatters.

Further, when a reflector serving as a marker exists, but the size of the reflector is unknown, if there is one or more pixel groups whose intensity is higher than the predetermined threshold within the intensity image, the image processing circuit calculates the three-dimensional size of a pixel group corresponding to each of those pixel groups within the distance image, and determines an object associated with a pixel group having a maximum of those three-dimensional sizes to be the reflector.

In contrast, when no reflector serving as a marker exists in the communication port of the other communication device, the image processing circuit performs scanning on an area widely in the vicinity of the communication port and is on standby until laser light radiated from the communication device and showing a state in which communications can be performed can be received, and determines a part where a high-intensity pattern appears within the intensity image to be the communication port. When such laser light cannot be received even if a time set by the user elapses after entering the standby state, the image processing circuit presents a warning showing that such laser light cannot be received to the user.

The image processing circuit 41 also specifies an unnecessary echo included in the distance image and the intensity image (step ST56).

For example, the image processing circuit extracts a pixel group whose intensity is higher than the predetermined threshold within the intensity image, calculates the three-dimensional size of a pixel group corresponding to that pixel group within the distance image, and, when the three-dimensional size is smaller than a predetermined size (a size set by the user), determine that the pixel group is an unnecessary echo caused by floating objects.

After the image processing circuit 41 specifies the communication port, the parameter setting circuit 42 of the signal processing circuit 11 performs control by setting the parameters for pulse laser light on the basis of the size of the communication port (setting the beam diameter or the angle of divergence) in such a way that the beam divergence of the pulse laser light has a size exactly including the above-mentioned communication port (step ST57).

The parameter setting circuit 42 also controls the amplification by the amplifier 9 within the reception system 32 in such a way that the amplification by the amplifier 9 is equivalent to the attenuation coefficient α of the laser light in the propagation space which is calculated by the reception circuit 35 for imaging (step ST57).

Further, when an unnecessary echo is specified by the image processing circuit 41, the parameter setting circuit 42 performs an adjustment of either the beam divergence or the gate time delay of the reception system 32 at the pixel position of the unnecessary echo on the basis of the size of the unnecessary echo or the distance to the unnecessary echo (step ST57).

Next, the system controller 33 converts information provided therefor from either the user or the system in which the communication device shown in FIG. 17 is mounted into communication data in order to start a communication operation when being triggered at the time of the completion of the processing by the signal processing circuit 11, and outputs the communication data to the light source control circuit 31.

When receiving the communication data from the system controller 33, the light source control circuit 31 controls the average power, the pulse repetition frequency, the pulse width, etc. of the laser light from the light source 2 in the transmission system 1 according to the communication data.

As a result, the pulse laser light (pulse laser light onto which the communication data are piggybacked) generated by the transmission system 1 is radiated toward the other communication device which is a communications partner from the transmission and reception optical system 4 (step ST58).

When a data communication request from the other communication device which is a communications partner is received (step ST59) after the pulse laser light is radiated from the transmission system 1, the system controller 33 is on standby until pulse laser light from outside the communication device is received.

When no pulse laser light is received even after a standby time set by the user elapses, the system controller 33 presents a warning to the user.

After the transmission and reception optical system 4 receives pulse laser light (step ST60), the reception system 32 divides the received signal into two parts, and outputs one received signal to the signal processing circuit 11 and outputs the other received signal to the reception circuit 34 for communication via the system controller 33.

When receiving the received signal from the system controller 33, the reception circuit 34 for communication demodulates the received signal to extract communication data and display the communication data on the data display device 36.

When receiving the received signal from the reception system 32, the S/N calculation circuit 12 of the signal processing circuit 11 calculates the S/N ratio of the received signal, like that in accordance with any of above-mentioned Embodiments 1 to 5.

After the S/N calculation circuit 12 calculates the S/N ratio, the S/N comparison circuit 13 within the parameter setting circuit 42 of the signal processing circuit 11 compares the S/N ratio with a threshold Th, like that in accordance with any of above-mentioned Embodiments 1 to 5.

The parameter setting circuit 42 of the signal processing circuit 11 controls the radiation state of the laser light radiated by the transmission and reception optical system 4 by setting the parameters for laser light on the basis of the result of the comparison of the S/N ratio with the threshold Th (step ST61), like that in accordance with any of above-mentioned Embodiments 1 to 5.

When continuing the communications with the other communication device (step ST62), the communication device returns to the process of step ST57 and repeats the processes of steps ST57 to ST62.

When the imaging mode is set as the operation mode (step ST52), the system controller 33 causes the reception circuit 35 for imaging to start operating (step ST63).

The system controller 33 outputs a command to output pulse laser light having a constant repetition period to the light source control circuit 31 in order to start an imaging operation (step ST64).

When receiving the command to output pulse laser light having a constant repetition period from the system controller 33, the light source control circuit 31 generates a pulse signal having the constant repetition period and outputs the pulse signal to the transmission system 1, like in the case of the communication mode.

When receiving the pulse signal having the constant repetition period from the light source control circuit 31, the transmission system 1 outputs pulse laser light on the basis of the pulse signal.

When receiving the pulse laser light from the transmission system 1, the transmission and reception optical system 4 adjusts the beam divergence and the orientation of the pulse laser light according to an initial setting signal outputted from the system controller 33, and also adjusts the receiving field-of-view angle, like in the case of the communication mode. In the control of the orientation in the imaging, the transmission and reception opening for laser light is operated within the range corresponding to the angle of view of one frame, at intervals of the predetermined driving angle.

The transmission and reception optical system 4 radiates the pulse laser light after adjustment toward space while causing a part of the pulse laser light to branch off to output this part to the reception circuit 35 for imaging.

Further, when the pulse laser light radiated toward space is reflected by the other communication device which is a communications partner and returns thereto, the transmission and reception optical system 4 receives the pulse laser light and focuses this pulse laser light onto the light receiver 8 within the reception system 32.

The light receiver 8 within the reception system 32 converts the pulse laser beam which is the reflected light into an electric signal (received signal), and causes a part of the received signal to branch off to output this part to the signal processing circuit 11. A received signal other than the part is amplified to a desired signal level by the amplifier 9, and, after that, is outputted to the reception circuit 35 for imaging.

At that time, in the amplification of the signal level of the received signal, by using an amplifier having a gain curve in which its amplification varies with time according to the attenuation coefficient of the propagation space, signal processing can be performed while a laser energy loss occurring in the propagation space is recovered. As a trigger signal for changing the degree of amplification, the part of laser light which is caused to branch off by the transmission and reception optical system 4 can be used.

The reception circuit 35 for imaging observes the received signal outputted from the reception system 32 when being triggered by the pulse laser light (transmission laser light) outputted from the transmission and reception optical system 4, thereby measuring the time (arrival time) which elapses after the pulse laser beam is radiated from the transmission and reception optical system 4 until pulse laser beam which is reflected light is received by the transmission and reception optical system 4, and the peak intensity, like in the case of the communication mode.

After measuring the arrival time and the peak intensity of the reflected light, the reception circuit 35 for imaging generates a distance image and an intensity image about the other communication device which is a communications partner from the measurement results, and outputs the distance image and the intensity image to the signal processing circuit 11, like in the case of the communication mode. Further, the reception circuit for imaging displays the distance image and the intensity image on the data display device 36.

Although the example in which the reception circuit 35 for imaging generates a distance image and an intensity image is shown above, when the measurement results for one frame are acquired, the reception circuit 35 for imaging can alternatively output the measurement results to the data display device 36 and the data display device 36 can generate a distance image and an intensity image from the above-mentioned measurement results.

Further, after measuring a plurality of received pulses for each transmission pulse, the reception circuit 35 for imaging calculates the attenuation coefficient $\alpha$ of the pulse laser beam in the propagation space, as shown in the above equation (6) (step ST65).

When receiving the distance image and the intensity image from the reception circuit 35 for imaging, the image processing circuit 41 of the signal processing circuit 11 analyzes the distance image and the intensity image to specify an object (e.g., a communication port in the other communication device which is a communications partner) which is included in the distance image and the intensity image and which is specified by the user, and also specifies an unnecessary echo (step ST66), like in the case of the communication mode.

After the image processing circuit 41 specifies the communication port, the parameter setting circuit 42 of the signal processing circuit 11 performs control by setting the parameters for pulse laser light on the basis of the size of the communication port (setting the beam diameter or the angle of divergence) in such a way that the beam divergence of the pulse laser light has a size exactly including the above-mentioned communication port (step ST67).

The parameter setting circuit 42 also controls the amplification by the amplifier 9 within the reception system 32 in such a way that the amplification by the amplifier 9 is equivalent to the attenuation coefficient α of the laser light in the propagation space which is calculated by the reception circuit 35 for imaging (step ST67).

Further, when an unnecessary echo is specified by the image processing circuit 41, the parameter setting circuit 42 performs an adjustment of either the beam divergence or the gate time delay of the reception system 32 at the pixel position of the unnecessary echo on the basis of the size of the unnecessary echo or the distance to the unnecessary echo (step ST67).

When continuing the imaging mode (step ST68), the communication device returns to the process of step ST64 and repeats the processes of steps ST64 to ST68.

As can be seen from the above description, in accordance with this Embodiment 6, the imaging function and the communication function can be used together within the single communication device, and system parameters in which the communication quality is optimized in advance by using imaging can be set. Further, the use of the imaging information for the grasping of the environment makes it possible to set more precise system parameters in real time.

Embodiment 7

Although the bidirectional communication system in which the communication device A and the communication device B perform bidirectional communications with each other is explained in above-mentioned Embodiment 1, a case in which one station aligns a plurality of vehicles by performing communications with a plurality of communication devices respectively mounted in the plurality of vehicles by using a communication device mounted therein will be explained in this Embodiment 7.

Figure 20:
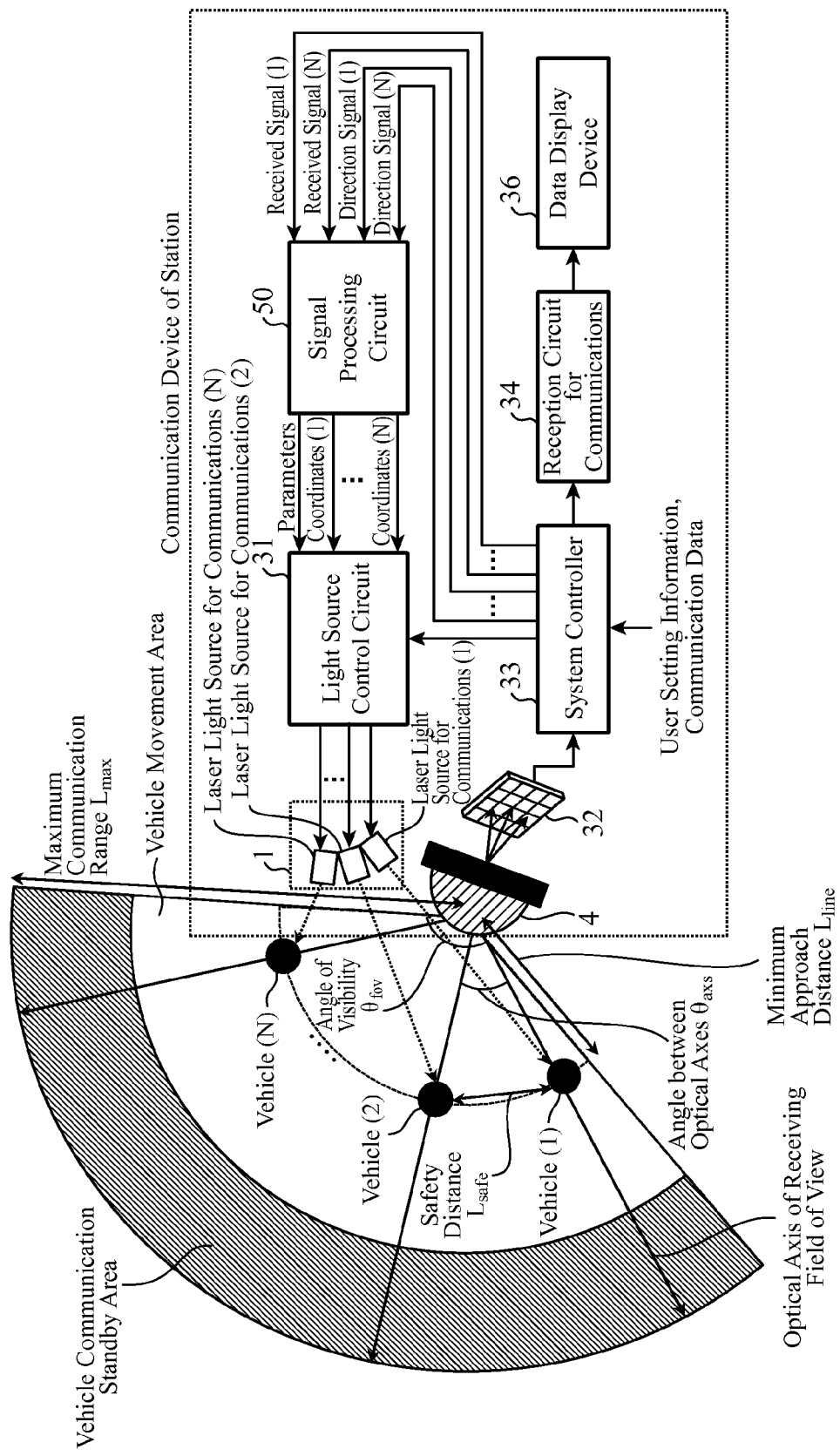
FIG. 20 is a configuration diagram showing a communication system in accordance with Embodiment 7 of the present invention.

FIG. 20 is a configuration diagram showing a communication system in accordance with Embodiment 7 of the present invention. In FIG. 20, because the same reference numerals as those shown in FIG. 17 denote the same components or like components, the explanation of the components will be omitted hereafter.

Although a transmission system 1 is configured with a light source 2 and an optical modulator 3, like those in accordance with above-mentioned Embodiments 1 to 6, the transmission system includes light sources whose number is equal to the number of vehicles each of which is a communications partner. In the example shown in FIG. 20, because the number of vehicles each of which is a communications partner is N (N is an integer which is equal to or larger than 1), the transmission system includes N light sources as laser light sources for communications (1) to (N). Although no transmission optical system is mounted in the communication device of the station shown in FIG. 20, a transmission optical system 5 can be disposed in the communication device of the station.

A reception optical system 6 of the transmission and reception optical system 4 uses, for example, a lens having a wide angle of visibility, such as a wide angle lens, in order to enable the communication device to communicate with the N vehicles existing forward of the station.

A light receiver 8 of a reception system 32 uses a photodetector consisting of a two-dimensional array element in order to enable the communication device to communicate with the N vehicles.

A signal processing circuit 50 is configured with an S/N calculation circuit 12, a parameter setting circuit 42, a vehicle current position coordinate calculator 51, and a vehicle movement destination coordinate calculator 52.

Figure 21:
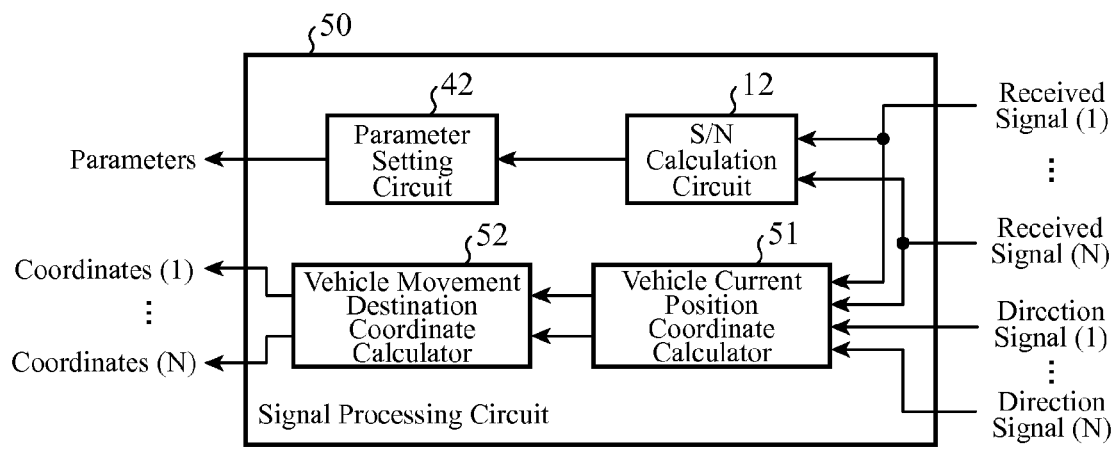
FIG. 21 is a configuration diagram showing a signal processing circuit of a communication device in accordance with Embodiment 7 of the present invention.

FIG. 21 is a configuration diagram showing the signal processing circuit 50 of the communication device in accordance with Embodiment 7 of the present invention. In FIG. 21, because the same reference numerals as those shown in FIG. 18 denote the same components or like components, the explanation of the components will be omitted hereafter.

After the reception system 32 receives laser light beams radiated from the communication devices mounted in the vehicles (1) to (N), the vehicle current position coordinate calculator 51 performs a process of determining the distance $L_{sb}$ between the station and each of the vehicles (1) to (N) from distance information included in communication data piggybacked onto the laser light beam, also determining the direction θ, φ in which each of the vehicles (1) to (N) exists when viewed from the station from image formation positions on the two dimensional array element which constructs the reception system 32, and calculating the coordinates ($x_1$, $y_1$, $z_1$) of the position at which each of the vehicles (1) to (N) exists from the distance $L_{sb}$ and the direction θ, φ. The vehicle current position coordinate calculator 51 constructs a position coordinate calculator.

The vehicle movement destination coordinate calculator 52 performs a process of calculating a minimum approach distance $L_{line}$ up to which the station can approach each of the vehicles (1) to (N) from a safety distance $L_{safe}$ which should be ensured between vehicles, and an angle $θ_{axs}$ between optical axes (angle between station-to-vehicle straight lines), and calculating coordinates ($x_2$, $y_2$, $z_2$) showing a movement destination of each of the vehicles (1) to (N) from the minimum approach distance $L_{line}$, and the direction θ', φ' in which each of the vehicles (1) to (N) exists when the vehicles (1) to (N) are aligned at equal intervals. The vehicle movement destination coordinate calculator 52 constructs a movement destination coordinate calculator.

Although not illustrated in FIG. 21, a reception circuit 35 for imaging as shown in FIG. 17 can be mounted in the communication device of the station.

Next, operations will be explained.

Although the example in which the single station aligns the N vehicles at equal intervals will be explained in this Embodiment 7, it is assumed hereafter that when the number of vehicles is larger than a permissible number (an upper limit on the number of vehicles which can exist within the communications area of the station (within a movement area shown in FIG. 20)), vehicles whose number is an excess over the permissible number are moved to a communications standby area which is preset separately.

Because this Embodiment 7 differs from above-mentioned Embodiment 6 in that the signal processing circuit 50 includes the vehicle current position coordinate calculator 51 and the vehicle movement destination coordinate calculator 52, the details of processing performed by the vehicle current position coordinate calculator 51 and the details of processing performed by the vehicle movement destination coordinate calculator 52 will be explained mainly.

Figure 22:
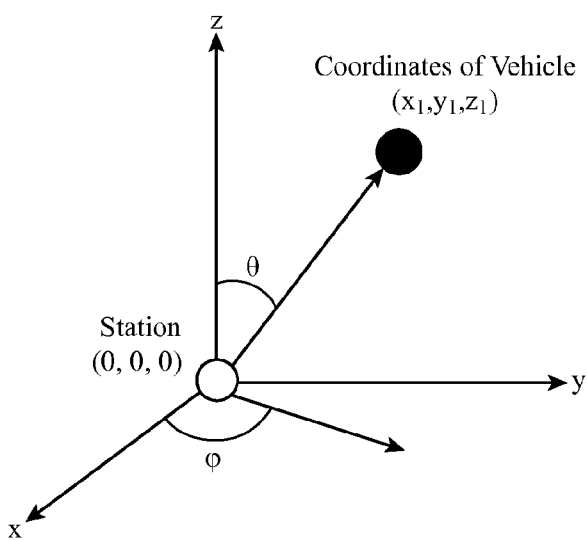
FIG. 22 is an explanatory drawing showing the position coordinates of each vehicle which are calculated by a vehicle current position coordinate calculator 51.

FIG. 22 is an explanatory drawing showing the position coordinates of each vehicle which are calculated by the vehicle current position coordinate calculator 51.

Figure 23:
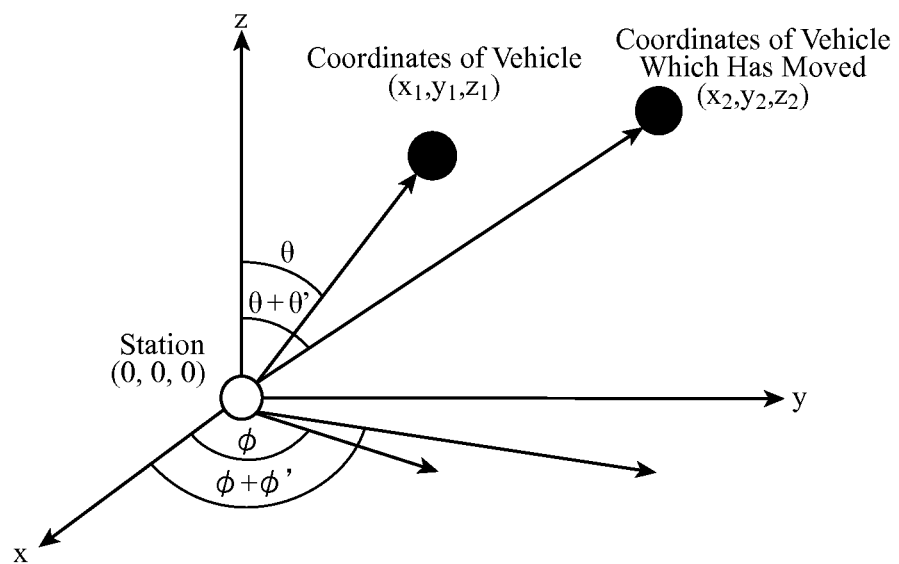
FIG. 23 is an explanatory drawing showing the position coordinates of a movement destination of each vehicle which are calculated by a vehicle movement destination coordinate calculator 52.

FIG. 23 is an explanatory drawing showing the position coordinates of the movement destination of each vehicle which are calculated by the vehicle movement destination coordinate calculator 52.

Figure 24:
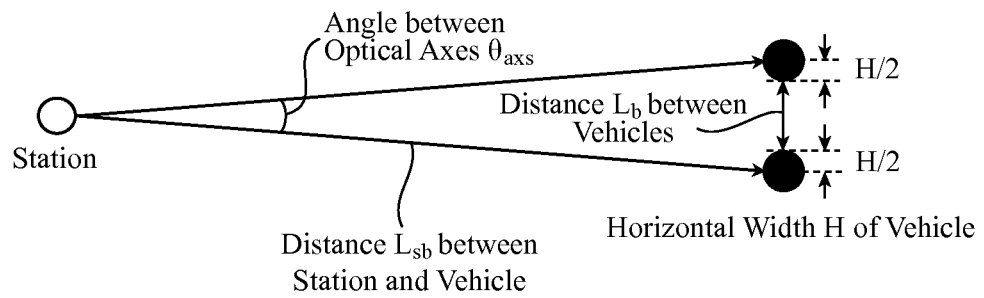
FIG. 24 is an explanatory drawing showing a positional relationship between a station and each vehicle.

FIG. 24 is an explanatory drawing showing a positional relationship between the station and each vehicle.

Figure 25:
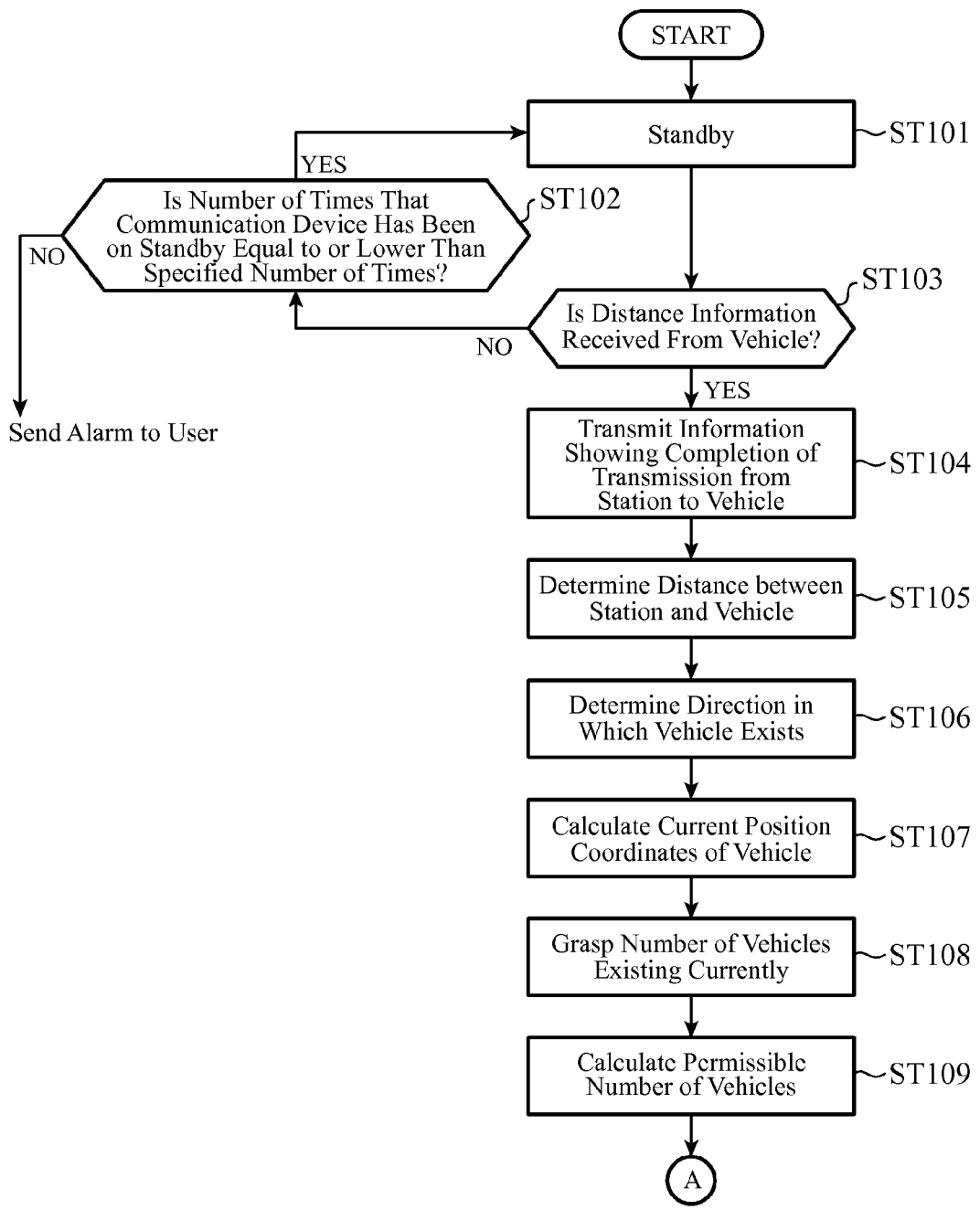
FIG. 25 is a flow chart (first half) showing the details of processing performed by a communication device of the station in accordance with Embodiment 7 of the present invention.
Figure 26:
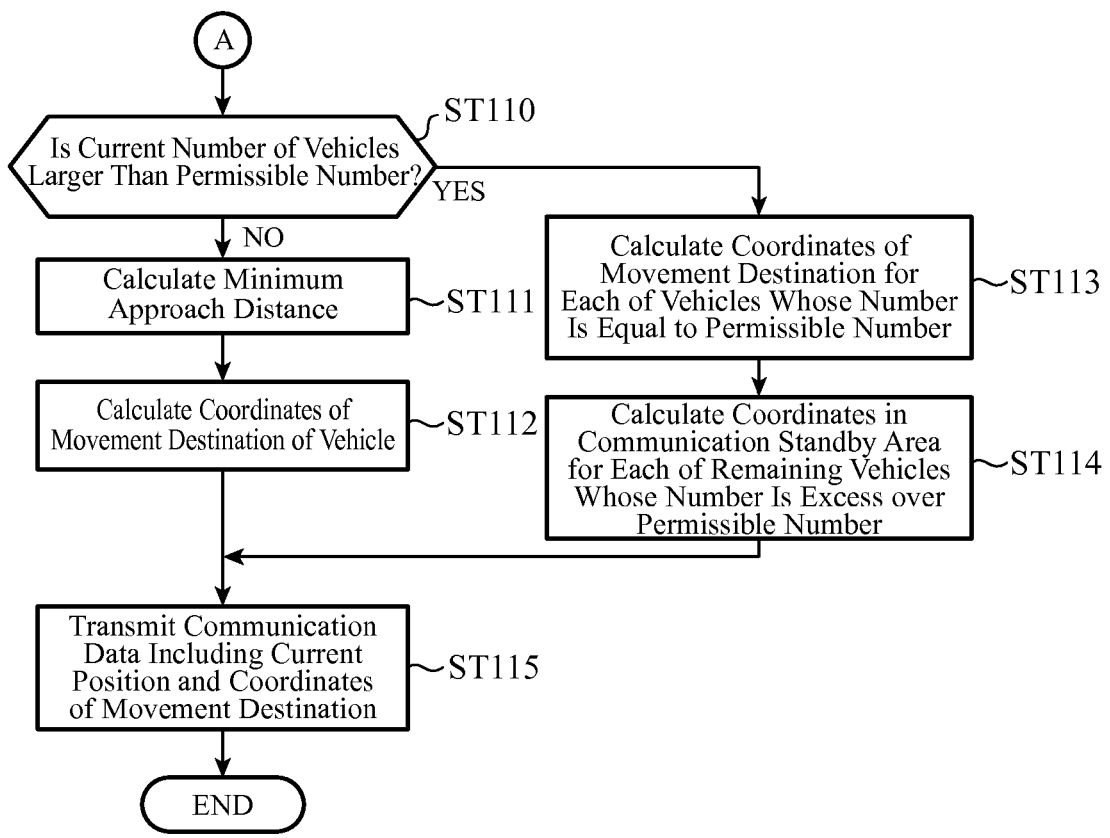
FIG. 26 is a flow chart (second half) showing the details of processing performed by the communication device of the station in accordance with Embodiment 7 of the present invention.
Figure 27:
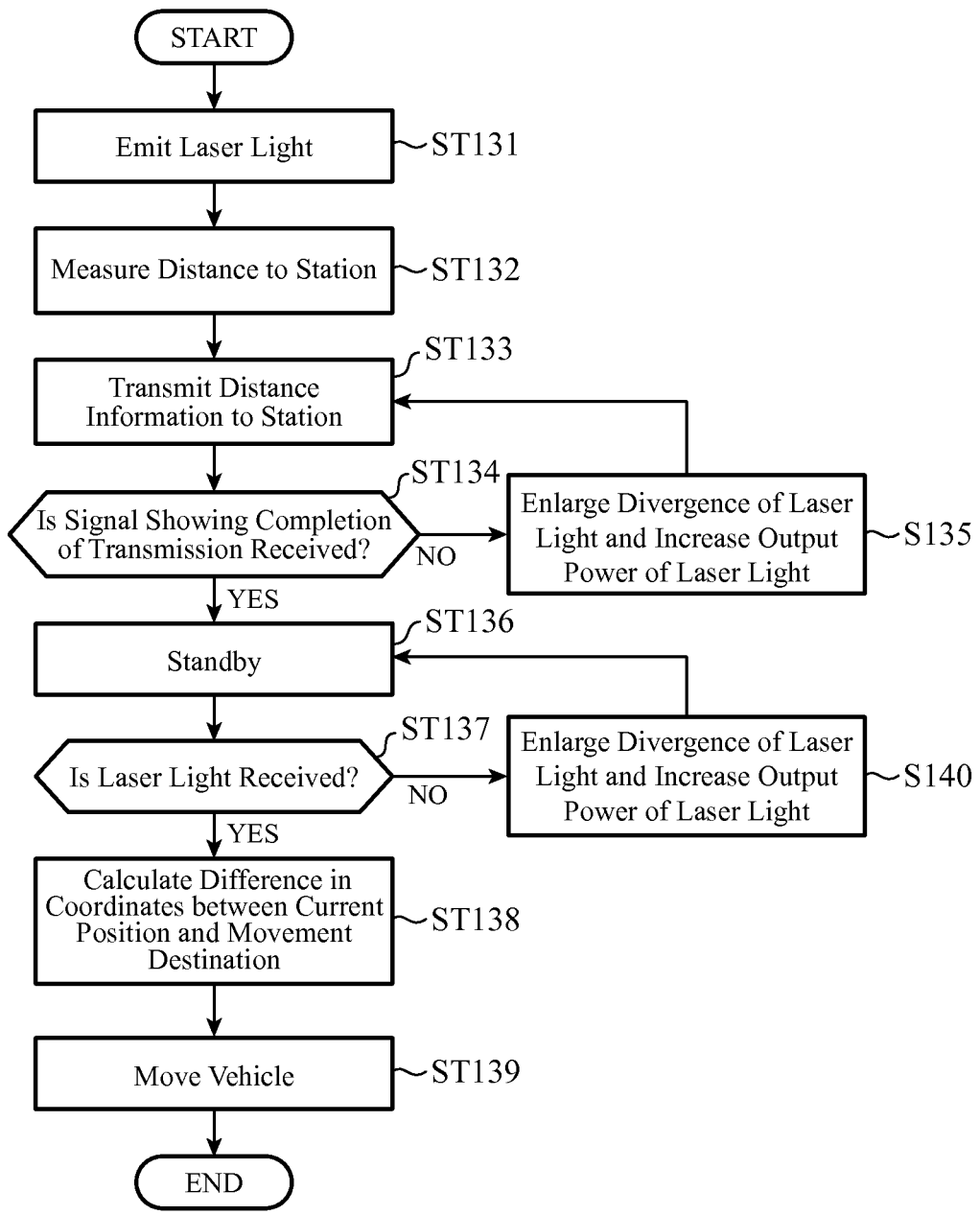
FIG. 27 is a flow chart showing the details of processing performed by a communication device of each vehicle in accordance with Embodiment 7 of the present invention.

FIGS. 25 and 26 are flow charts showing the details of processing performed by the communication device of the station in accordance with Embodiment 7 of the present invention, and FIG. 27 is a flow chart showing the details of processing performed by the communication device of each vehicle in accordance with Embodiment 7 of the present invention.

First, the communication device which is mounted in each vehicle and which is a communications partner measures the distance $L_{sb}$ between the vehicle equipped with the communication device itself and the station.

More specifically, in the communication device which is a communications partner, the transmission system 1 radiates laser light for distance measurement toward the station (step ST131 of FIG. 27).

When, after the transmission system 1 radiates laser light, the reception system 32 receives reflected light of the above-mentioned laser light which is reflected by the station and then returns to the communication device, the signal processing circuit 11 of the communication device which is a communications partner measures the distance $L_{sb}$ between the vehicle equipped with the communication device itself and the station from the time difference between the time when the laser light is radiated from the transmission system 1 and the time when the reflected light is received by the reception system 32 (step ST132).

When the speed of light is denoted by c and the time difference between the time when the laser light is radiated and the time when the reflected light is received is denoted by τ, the distance $L_{sb}$ between the station and each vehicle can be calculated as shown in the following equation (7).

$$L_{sb} = \frac{c\tau}{2} \quad (7)$$

After the signal processing circuit 11 measures the distance $L_{sb}$ between the vehicle and the station, the transmission system 1 of the communication device which is a communications partner radiates laser light onto which communication data including distance information showing the distance $L_{sb}$ are piggybacked toward the station (step ST133).

After the reception system 32 receives the laser light radiated from the communication device mounted in each of the vehicles (1) to (N) (steps ST101 to ST103 of FIG. 25), the communication device mounted in the station outputs the distance information included in the communication data piggybacked onto the laser light to the vehicle current position coordinate calculator 51 of the signal processing circuit 50.

Further, in the communication device mounted in the station, the transmission system 1 radiates laser light onto which information showing that the transmission of the communication data including the distance information is completed is piggybacked toward the corresponding vehicle (step ST104).

When receiving the laser light onto which the information showing that the transmission is completed is piggybacked from the communication device mounted in the station (step ST134 of FIG. 27), the communication device which is mounted in each vehicle and which is a communications partner is on standby until laser light onto which information about a movement position is piggybacked is transmitted (step ST136).

At that time, when the laser light onto which the information showing that the transmission is completed is piggybacked cannot be received from the communication device mounted in the station, the communication device performs an adjustment such as an adjustment to enlarge the divergence of the laser light or increase the output power of the laser light (step ST135).

When receiving the distance information included in the communication data from the reception system 32, the vehicle current position coordinate calculator 51 of the communication device mounted in the station determines the distance $L_{sb}$ between the station and each vehicle from the distance information (step ST105 of FIG. 25).

Further, the vehicle current position coordinate calculator 51 refers to each pixel value of the two dimensional array element which constructs the reception system 32 to determine the image formation positions on the two dimensional array element, and determine the direction θ, φ in which each of the N vehicles (1) to (N) exists from the image formation positions on the two dimensional array element (step ST106).

When the image formation positions on the two dimensional array element are determined, Gauss fitting can be performed on each pixel value of the two dimensional array element to determine the image formation positions, or the center of gravity of each pixel value can be calculated to determine the image formation positions.

After determining the distance $L_{sb}$ between the station and each of the vehicles (1) to (N), and the direction θ, φ in which each of the vehicles (1) to (N) exists, the vehicle current position coordinate calculator 51 calculates the coordinate $(x_1, y_1, z_1)$ of the position at which each of the vehicles (1) to (N) exists currently from the distance $L_{sb}$ and the direction θ, φ, as shown in the following equation (8) (step ST107). At that time, the position of the station is defined as the position coordinates of the point of origin.

$$\begin{pmatrix} x_1 \\ y_1 \\ z_1 \end{pmatrix} = \begin{pmatrix} L_{sb}\sin\theta\cos\phi \\ L_{sb}\sin\theta\sin\phi \\ L_{sb}\cos\theta \end{pmatrix} \quad (8)$$

The vehicle movement destination coordinate calculator 52 refers to each pixel value of the two dimensional array element which constructs the reception system 32 to count the number of received signals associated with vehicles, thereby grasping the number N of vehicles currently existing (step ST108).

Further, in order to calculate the permissible number of vehicles, the vehicle movement destination coordinate calculator 52 calculates the angles between station-to-vehicle straight lines (angles $\theta_{axs}$, $\phi_{axs}$ between optical axes), which are determined from the distance $L_b$ between vehicles, the distance $L_{sb}$ between the station and each vehicle, and the horizontal width H of each vehicle, as shown in FIG. 24.

$$\theta_{axs} = 2 \times \text{Arcsin}\left(\frac{H + L_b}{2 \cdot L_{sb}}\right) \quad (9)$$

$$\phi_{axs} = 2 \times \text{Arcsin}\left(\frac{H + L_b}{2 \cdot L_{sb}}\right) \quad (10)$$

After calculating the angles $\theta_{axs}$, $\phi_{axs}$ between optical axes, the vehicle movement destination coordinate calculator 52 calculates the permissible number $N_{all}$ of vehicles from the angles $\theta_{axs}$, $\phi_{axs}$ between optical axes, and the receiving field-of-view angles $\theta_{fov}$, $\phi_{fov}$ of the transmission and reception optical system 4 in the station, as shown in the following equations (11) to (13) (step ST109).

$$N_{max} = \left[\frac{\theta_{fov}}{\theta_{axs}}\right] \quad (11)$$

$$N'_{max} = \left[\frac{\phi_{fov}}{\phi_{axs}}\right] \quad (12)$$

$$N_{all} = N_{max} \times N'_{max} \quad (13)$$

The receiving field-of-view angles $\theta_{fov}$, $\phi_{fov}$ can be expressed as shown in the following equations (14) and (15), when the focal distance is denoted by f and the size of every pixel is denoted by p.

$$\theta_{fov} = 2 \times \text{Arctan}\left(\frac{p}{2f}\right) \quad (14)$$

$$\phi_{fov} = 2 \times \text{Arctan}\left(\frac{p}{2f}\right) \quad (15)$$

The bearing resolution depends on the pixel pitch.

In this embodiment, although the permissible number $N_{a11}$ of vehicles is calculated in the above-mentioned way, the user can be alternatively allowed to set the permissible number $N_{a11}$ of vehicles.

After calculating the permissible number $N_{all}$ of vehicles, the vehicle movement destination coordinate calculator 52 compares the permissible number $N_{all}$ of vehicles with the number N of vehicles existing currently (step ST110 of FIG. 26).

When the number N of vehicles existing currently is equal to or smaller than the permissible number $N_{all}$ ($N_{all} \geq N$), the vehicle movement destination coordinate calculator 52 calculates coordinates ($x_2$, $y_2$, $z_2$) showing the movement destination of each of the vehicles existing currently, as shown below.

In contrast, when the number N of vehicles existing currently is larger than the permissible number $N_{all}$ ($N_{all} < N$), for vehicles whose number is equal to the permissible number, the vehicle movement destination coordinate calculator calculates coordinates ($x_2$, $y_2$, $z_2$) showing the movement destination of each of the vehicles, whereas for remaining vehicles whose number is an excess over the permissible number $N_{all}$ (remaining vehicles whose number is equal to (the number N of vehicles existing currently—the permissible number)), the vehicle movement destination coordinate calculator calculates coordinates showing the communications standby area for vehicles as shown in, for example, FIG. 20 as coordinates showing the movement destination.

Hereafter, the details of processing performed by the vehicle movement destination coordinate calculator 52 when the number N of vehicles existing currently is equal to or smaller than the permissible number $N_{all}$ ($N_{all} \geq N$) will be explained concretely.

First, the vehicle movement destination coordinate calculator 52 calculates the minimum approach distance $L_{line}$ up to which the station can approach each of the vehicles (1) to (N) from the safety distance $L_{safe}$ which should be ensured between vehicles, and the angle $\theta_{axs}$ between optical axes, as shown in the following equation (16) (step ST111).

$$L_{line} = \frac{L_{safe}}{\theta_{axs}} \quad (16)$$

In this case, the safety distance $L_{safe}$ is about 5 to 10 m, and can be preset by the user. The safety distance $L_{safe}$ can be made to be varied according to the tidal current.

After calculating the minimum approach distance $L_{line}$, the vehicle movement destination coordinate calculator 52 calculates the coordinates ($x_2$, $y_2$, $z_2$) showing the movement destination of each of the vehicles (1) to (N) from both the minimum approach distance $L_{line}$ and the direction $\theta'$, $\phi'$ in which each of the vehicles (1) to (N) exists when the vehicles (1) to (N) are aligned at equal intervals (direction $\theta'$, $\phi'$ is uniquely determined from the number of vehicles (1) to (N), the maximum angle of visibility of the transmission and reception optical system 4, etc.), as shown in the following equation (17) (step ST112).

$$\begin{pmatrix} x_2 \\ y_2 \\ z_2 \end{pmatrix} = \begin{pmatrix} L_{line}\sin\theta'\cos\phi' \\ L_{line}\sin\theta'\sin\phi' \\ L_{line}\cos\theta' \end{pmatrix} \quad (17)$$

Next, the details of processing performed by the vehicle movement destination coordinate calculator 52 when the number N of vehicles existing currently is larger than the permissible number $N_{a11}$ ($N_{all} < N$) will be explained concretely.

First, for vehicles whose number is equal to the permissible number, the vehicle movement destination coordinate calculator 52 calculates the coordinates ($x_2$, $y_2$, $z_2$) showing the movement destination of each of the vehicles, like at the time when the number N of vehicles existing currently is equal to or smaller than the permissible number $N_{all}$ (step ST113).

Further, for remaining vehicles whose number is an excess over the permissible number $N_{all}$ (remaining vehicles whose number is equal to (the number N of vehicles existing currently—the permissible number)), the vehicle movement destination coordinate calculator calculates the coordinates showing the communications standby area for vehicles as shown in, for example, FIG. 20 as the coordinates showing the movement destination (step ST114). The communications standby area for vehicles is usually set to be located at a position at which there is no possibility that vehicles collide with the vehicles (vehicles whose number is equal to the permissible number $N_{all}$) each of which is a communication object, and interfere with their communications.

When there exist a plurality of vehicles whose number is an excess over the permissible number $N_{all}$, the vehicle movement destination coordinate calculator calculates position coordinates which prevent each of the vehicles from colliding with one another and which prevent each of the vehicles from interfering with communications.

While the parameter setting circuit 42 sets parameters for laser light to control the radiation state of each laser light beam radiated by the transmission and reception optical system 4, like that in accordance with above-mentioned Embodiment 6, the parameter setting circuit adjusts the divergence of each laser light beam in such a way that the beam does not overlap any other beam for each of the vehicles, in this Embodiment 7.

More specifically, the parameter setting circuit 42 calculates the diameter of each beam in the station from the beam diameter of the laser light at the emitting end, the distance between each of the vehicles and the station, and the divergence of the beam, and adjusts the divergence of each beam by adjusting the distance between each of the vehicles and the station, and the position of the transmission lens in such a way that the laser light does not enter adjacent vehicles.

After the vehicle current position coordinate calculator 51 calculates the coordinates $(x_1, y_1, z_1)$ of the position at which each of the vehicles (1) to (N) exists and the vehicle movement destination coordinate calculator 52 calculates the coordinates $(x_2, y_2, z_2)$ showing the movement destination of each of the vehicles (1) to (N) (including the case in which the coordinates $(x_2, y_2, z_2)$ showing the movement destination are the coordinates showing the communications standby area), the light source control circuit 31 controls the average power, the pulse repetition frequency, the pulse width, etc. of laser light from the light source 2 corresponding to each of the vehicles (1) to (N) in the transmission system 1 according to the communication data including both the coordinates $(x_1, y_1, z_1)$ of the position at which each of the vehicles (1) to (N) exists and the coordinates $(x_2, y_2, z_2)$ showing the movement destination of each of the vehicles (1) to (N) (step ST115).

As a result, pulse laser light (pulse laser light onto which the communication data are piggybacked) generated by the transmission system 1 is radiated with the divergence adjusted by the parameter setting circuit 42 from the transmission and reception optical system 4 toward the communication device mounted in each of the vehicles (1) to (N).

When receiving the laser light radiated from the communication device of the station (step ST137 of FIG. 27), the communication device mounted in each of the vehicles (1) to (N) grasps the coordinates $(x_1, y_1, z_1)$ of the current position of the vehicle in which the communication device itself is mounted, and the coordinates $(x_2, y_2, z_2)$ showing the movement destination of the vehicle in which the communication device itself is mounted from the communication data piggybacked onto the laser light, and outputs the difference coordinates $(x_1-x_2, y_1-y_2, z_1-z_2)$ between the coordinates $(x_1, y_1, z_1)$ of the current position and the coordinates $(x_2, y_2, z_2)$ showing the movement destination to a drive control system (not shown) of the vehicle (step ST138).

The drive control system (not shown) of each vehicle moves the vehicle according to the difference coordinates $(x_1-x_2, y_1-y_2, z_1-z_2)$ outputted from the communication device (step ST139).

At that time, when the laser light radiated from the communication device mounted in the station cannot be received, the communication device performs an adjustment such as an adjustment to enlarge the divergence of the laser light or increase the output power of the laser light (step ST140).

Although the example in which the light source control circuit 31 transmits the communication data including both the coordinates $(x_1, y_1, z_1)$ of the position at which each of the vehicles (1) to (N) exists and the coordinates $(x_2, y_2, z_2)$ showing the movement destination of each of the vehicles (1) to (N) to the communication device mounted in the corresponding one of the vehicles (1) to (N) is shown in this embodiment, the vehicle movement destination coordinate calculator 52 can be alternatively configured in such a way as to, for example, construct a difference coordinate calculator to calculate the difference coordinates $(x_1-x_2, y_1-y_2, z_1-z_2)$ between the coordinates $(x_1, y_1, z_1)$ of the position at which each of the vehicles (1) to (N) exists, which are calculated by the vehicle current position coordinate calculator 51, and the coordinates $(x_2, y_2, z_2)$ showing the movement destination of each of the vehicles (1) to (N), and the light source control circuit 31 can be configured in such a way as to transmit communication data including the difference coordinates $(x_1-x_2, y_1-y_2, z_1-z_2)$ to the communication device mounted in the corresponding one of the vehicles (1) to (N).

In this case, after receiving the laser light radiated from the communication device of the station, the communication device mounted in each of the vehicles (1) to (N) acquires the difference coordinates $(x_1-x_2, y_1-y_2, z_1-z_2)$ from the communication data piggybacked onto the laser light, and outputs the difference coordinates $(x_1-x_2, y_1-y_2, z_1-z_2)$ to the drive control system (not shown) of the vehicle.

As can be seen from the above description, because the communication device of the station in accordance with this Embodiment 7 is configured in such a way as to include the vehicle current position coordinate calculator 51 to, after the reception system 32 receives laser light beams radiated from the communication devices mounted in the vehicles (1) to (N), perform the process of determining the distance $L_{sb}$ between the station and each of the vehicles (1) to (N) from distance information included in communication data piggybacked onto the laser light beam, also determine the direction $\theta, \phi$ in which each of the vehicles (1) to (N) exists from the image formation positions on the two dimensional array element which constructs the reception system 32, and calculate the coordinates $(x_1, y_1, z_1)$ of the position at which each of the vehicles (1) to (N) exists from the distance $L_{sb}$ and the direction $\theta, \phi$, and the vehicle movement destination coordinate calculator 52 to perform the process of calculating the minimum approach distance $L_{line}$ up to which the station can approach each of the vehicles (1) to (N) from the safety distance $L_{safe}$ which should be ensured between vehicles, and the angle $\theta_{axs}$ between optical axes, and calculate the coordinates $(x_2, y_2, z_2)$ showing the movement destination of each of the vehicles (1) to (N) from the minimum approach distance $L_{line}$, and a direction $\theta', \phi'$ in which each of the vehicles (1) to (N) exists when the vehicles (1) to (N) are aligned at equal intervals, there is provided an advantage of enabling the station to align the N vehicles at optimal positions.

Further, because the communication device of the station in accordance with this Embodiment 7 is configured in such a way that when the number of the vehicles existing currently exceeds the permissible number $N_{all}$, the vehicle movement destination coordinate calculator 52 calculates coordinates showing the preset communications standby area as the coordinates showing the movement destination of each of vehicles whose number is an excess over the permissible number $N_{all}$, there is provided an advantage of enabling the communication device of the station to communicate, at one time, with the communication device mounted in each of a maximum number of vehicles with which communications can be performed without causing a risk of collisions and the occurrence of communication failures due to an excessive number of vehicles.

Embodiment 8

Figure 28:
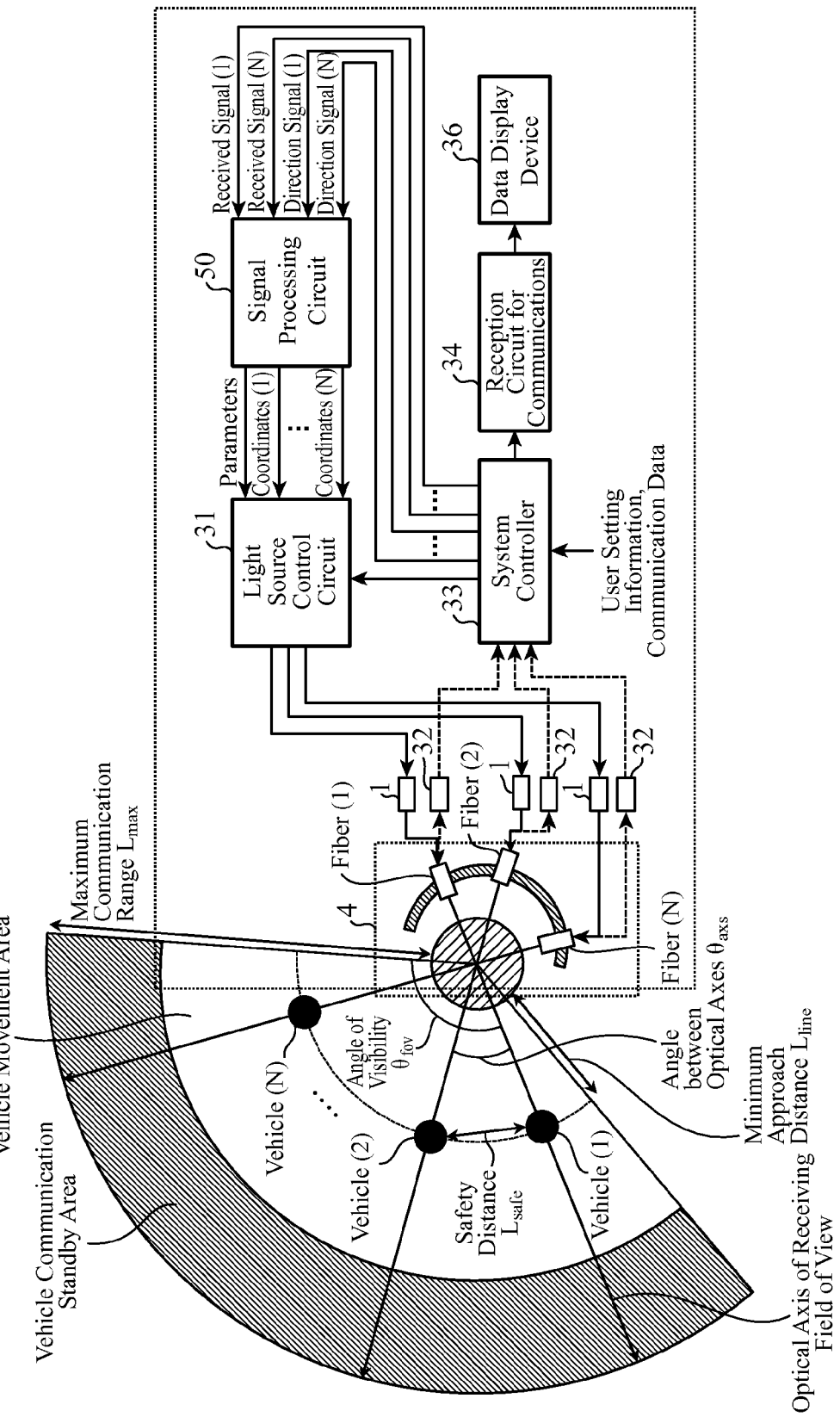
FIG. 28 is a configuration diagram showing a communication system in accordance with Embodiment 8 of the present invention.

FIG. 28 is a configuration diagram showing a communication system in accordance with Embodiment 8 of the present invention. In FIG. 28, because the same reference numerals as those shown in FIG. 20 denote the same components or like components, the explanation of the components will be omitted hereafter.

As each set of a transmission system 1 and a reception system 32, for example, an optical circulator is used, and light sources whose number is equal to the number of vehicles with each of which a station communicates are disposed. Each transmission system 1 emits laser light via an optical fiber, and reflected light from a target object is received by each reception system 32.

Although the example in which the communication device of the station is configured to include the separately disposed transmission and reception systems is shown in above-mentioned Embodiment 7, the communication device of the station can be configured to have a coaxial structure for both transmission and reception in order to achieve downsizing of the communication device.

More specifically, the vehicle current position coordinate calculator 51 in accordance with above-mentioned Embodiment 7 refers to each pixel value of the two dimensional array element which constructs the reception system 32 to determine the image formation positions on the two dimensional array element and also determine the direction θ, φ in which each of the vehicles (1) to (N) exists from the image formation positions on the two dimensional array element. In contrast, a vehicle current position coordinate calculator in accordance with this Embodiment 8 determines an optical fiber, from among a plurality of optical fibers, which receives laser light radiated from the communication device mounted in each of the vehicles (1) to (N), and then determines the direction θ, φ in which each of the vehicles (1) to (N) exists from the position of the optical fiber receiving the laser light.

Because each of the plurality of optical fibers can focus the laser light along a predetermined optical axis by way of a ball lens, when the communication device succeeds in receiving communication data piggybacked onto the laser light radiated from each vehicle, the communication device radiates laser light having a laser wavelength specific to the station toward each vehicle as a response from the station.

Because the communication device of the station in accordance with this Embodiment 8 is configured to have a coaxial structure for both transmission and reception, communications which prevent a cross talk of light can be performed even when a plurality of vehicles exist.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The communication device in accordance with the present invention is suitable for use as a communication device that needs to implement communications with high quality even if the amount of information transmitted in wireless communications is large.

EXPLANATIONS OF REFERENCE NUMERALS 1 transmission system (beam transmitter), 2 light source, 3 and 3a light modulator, 4 transmission and reception optical system, 5 transmission optical system (beam transmitter), 6 and 6a reception optical system (beam receiver), 7 reception system, 8 light receiver (beam receiver), 9 amplifier, 10 and 10a demodulator (signal demodulator), 11 signal processing circuit, 12 and 12a S/N calculation circuit (signal to noise ratio calculator), 13 S/N comparison circuit (beam radiation state controller), 14, 14a, and 14b parameter setting circuit (beam radiation state controller), 21 reflector, 22 BER calculation circuit (bit error rate calculator), 31 light source control circuit, 32 reception system, 33 system controller, 34 reception circuit for communication, 35 reception circuit for imaging (image generator, attenuation coefficient calculator), 36 data display device, 41 image processing circuit (beam radiation state controller), 42 parameter setting circuit (beam radiation state controller), 50 signal processing circuit, 51 vehicle current position coordinate calculator (position coordinate calculator), and 52 vehicle movement destination coordinate calculator (movement destination coordinate calculator, difference coordinate calculator).

The invention claimed is:
1. A communication device comprising:
   a beam transmitter that includes an optical device to radiate a beam toward a communication device which is a communications partner;
   a beam receiver that includes an optical device to receive a beam coming from said communication device which is a communications partner;
   a signal demodulator that includes a processor to demodulate a received signal from said beam receiver to extract communication data piggybacked onto said beam;
   a signal to noise ratio calculator that includes processing circuitry to calculate a signal to noise ratio of the received signal from said beam receiver; and
   a beam radiation state controller that includes processing circuitry, the beam radiation state controller controlling said beam transmitter so as to control a radiation state of the beam according to the signal to noise ratio calculated by said signal to noise ratio calculator, and, when there occurs a state in which the signal to noise ratio calculated by said signal to noise ratio calculator temporarily becomes lower than a preset threshold and then becomes higher than said threshold, enlarge a beam diameter or an angle of divergence of the beam radiated from said beam transmitter.

2. The communication device according to claim 1, wherein said beam receiver receives the beam radiated from a beam transmitter mounted in said communication device which is a communications partner.

3. The communication device according to claim 1, wherein said beam receiver receives a beam which is reflected by said communication device which is a communications partner and returns thereto after being radiated from said beam transmitter.

4. The communication device according to claim 1, wherein when there continuously occurs a state in which the signal to noise ratio calculated by said signal to noise ratio calculator is lower than said threshold, said beam radiation state controller performs one or more of a control operation of increasing average power of the beam radiated from said beam transmitter, a control operation of narrowing a pulse width of said beam, and a control operation of lowering a pulse repetition frequency of said beam, whereas when there continuously occurs a state in which the signal to noise ratio calculated by said signal to noise ratio calculator is higher than said threshold, and a power consumption value of said beam transmitter is higher than a preset permissible value, said beam radiation state controller performs one or more of a control operation of decreasing the average power of the beam radiated from said beam transmitter, a control operation of widening the pulse width of said beam, and a control operation of raising the pulse repetition frequency of said beam.

5. The communication device according to claim 1, wherein said beam transmitter includes signal to noise ratio information showing the signal to noise ratio calculated by said signal to noise ratio calculator in communication data, and radiates a beam onto which said communication data are piggybacked toward said communication device which is a communications partner.

6. The communication device according to claim 5, wherein said beam radiation state controller controls the radiation state of the beam radiated from said beam transmitter according to the signal to noise ratio shown by the signal to noise ratio information included in the communication data extracted by said signal demodulator.

7. The communication device according to claim 1, wherein said beam transmitter includes beam radiation state information showing the radiation state of the beam controlled by said beam radiation state controller in communication data, and radiates a beam onto which said communication data are piggybacked toward said communication device which is a communications partner.

8. The communication device according to claim 7, wherein said beam radiation state controller controls the radiation state of the beam radiated from said beam transmitter according to the beam radiation state information included in the communication data extracted by said signal demodulator.

9. The communication device according to claim 1, wherein said communication device includes a bit error rate calculator to calculate a bit error rate of the received signal from said beam receiver, and said signal to noise ratio calculator calculates the signal to noise ratio of said received signal from the bit error rate calculated by said bit error rate calculator.

10. The communication device according to claim 1, wherein said communication device includes an image generator to measure both a time which elapses after the beam is radiated from said beam transmitter until the beam is received by said beam receiver, and intensity of said beam, and to generate an image about said communication device which is a communications partner from results of the measurement, and said beam radiation state controller specifies a communication port in said communication device which is a communications partner from the image generated by said image generator, and controls a beam diameter or an angle of divergence of the beam radiated by said beam transmitter on a basis of a size of said communication port.

11. The communication device according to claim 1, wherein said communication device includes an attenuation coefficient calculator to calculate an attenuation coefficient of the beam in propagation space from the received signal from said beam receiver, and said beam radiation state controller controls amplification of an amplifier to amplify the received signal from said beam receiver on a basis of the attenuation coefficient calculated by said attenuation coefficient calculator.

12. The communication device according to claim 1, wherein said communication device itself is mounted in a station and said communication device which is a communications partner is mounted in each of a plurality of vehicles, and wherein said communication device comprises: a position coordinate calculator to, at a time when the communication device, which is mounted in each of said plurality of vehicles and which is a communications partner, measures a distance between the vehicle in which said communication device itself is mounted and said station and radiates a beam onto which communication data including distance information showing said distance are piggybacked toward said station, determine a distance between said station and each of said plurality of vehicles from the distance information included in the communication data extracted by the signal demodulator of said communication device itself and also determine a direction in which each of said plurality of vehicles exists when viewed from said station from the received signal from the beam receiver of said communication device itself, and to calculate coordinates of a position at which each of said plurality of vehicles exists from both the distance between said station and each of said plurality of vehicles and the direction in which each of said plurality of vehicles exists; and a movement destination coordinate calculator to calculate a distance up to which said station can approach each of said plurality of vehicles from both a safety distance which should be ensured between said plurality of vehicles, and angles between optical axes which are provided among said plurality of vehicles, and to calculate coordinates showing a movement destination of each of said plurality of vehicles from both said distance up to which said station can approach each of said plurality of vehicles, and a direction in which each of said plurality of vehicles exists when said plurality of vehicles are aligned at equal intervals, and wherein the beam transmitter of said communication device itself includes the coordinates of the position at which each of the plurality of vehicles exists, the coordinates being calculated by said position coordinate calculator, and the coordinates showing the movement destination of each of the plurality of vehicles, the coordinates being calculated by said movement destination coordinate calculator, in communication data, and radiates a beam onto which said communication data are piggybacked toward the communication device which is mounted in each of said plurality of vehicles and which is a communications partner.

13. The communication device according to claim 12, wherein when a number of vehicles in each of which said communication device which is a communications partner is mounted is larger than a permissible number, said movement destination coordinate calculator calculates coordinates showing a preset communications standby area as the coordinates showing the movement destination of each of vehicles whose number is an excess over said permissible number.

14. The communication device according to claim 1, wherein said communication device itself is mounted in a station and said communication device which is a communications partner is mounted in each of a plurality of vehicles, and wherein said communication device comprises: a position coordinate calculator to, at a time when the communication device, which is mounted in each of said plurality of vehicles and which is a communications partner, measures a distance between the vehicle in which said communication device itself is mounted and said station and radiates a beam onto which communication data including distance information showing said distance are piggybacked toward said station, determine a distance between said station and each of said plurality of vehicles from the distance information included in the communication data extracted by the signal demodulator of said communication device itself and also determine a direction in which each of said plurality of vehicles exists when viewed from said station from the received signal from the beam receiver of said communication device itself, and to calculate coordinates of a position at which each of said plurality of vehicles exists from both the distance between said station and each of said plurality of vehicles and the direction in which each of said plurality of vehicles exists; a movement destination coordinate calculator to calculate a distance up to which said station can approach each of said plurality of vehicles from both a safety distance which should be ensured between said plurality of vehicles, and angles between optical axes which are provided among said plurality of vehicles, and to calculate coordinates showing a movement destination of each of said plurality of vehicles from both said distance up to which said station can approach each of said plurality of vehicles, and a direction in which each of said plurality of vehicles exists when said plurality of vehicles are aligned at equal intervals; and a difference coordinate calculator to calculate difference coordinates which are a difference between the coordinates of the position at which each of the plurality of vehicles exists, the coordinates being calculated by said position coordinate calculator, and the coordinates calculated by said movement destination coordinate calculator and showing the movement destination of each of the plurality of vehicles, and wherein the beam transmitter of said communication device itself includes the difference coordinates calculated by said difference coordinate calculator in communication data, and radiates a beam onto which said communication data are piggybacked toward the communication device which is mounted in each of said plurality of vehicles and which is a communications partner.

15. The communication device according to claim 14, wherein when a number of vehicles in each of which said communication device which is a communications partner is mounted is larger than a permissible number, said movement destination coordinate calculator calculates coordinates showing a preset communications standby area as the coordinates showing the movement destination of each of vehicles whose number is an excess over said permissible number.

* * * * *